(12) United States Patent
Mori et al.

(10) Patent No.: US 8,062,466 B2
(45) Date of Patent: Nov. 22, 2011

(54) BASE MATERIAL FOR ADHESION AND SILICONE RUBBER-ADHERED ARTICLE USING THEREOF

(75) Inventors: Kunio Mori, Morioka (JP); Kazuhisa Takagi, Saitama (JP)

(73) Assignee: Asahi Rubber Inc., Saitama (JP)

( * ) Notice: Subject to any disclaimer, the term of this patent is extended or adjusted under 35 U.S.C. 154(b) by 792 days.

(21) Appl. No.: 12/149,673

(22) Filed: May 6, 2008

(65) Prior Publication Data

US 2009/0277581 A1 Nov. 12, 2009

(51) Int. Cl.
*C04B 37/00* (2006.01)
*C09J 7/02* (2006.01)
*C08F 8/00* (2006.01)
*C08F 283/00* (2006.01)
*C08F 283/12* (2006.01)
*C08L 83/00* (2006.01)
*C08G 77/00* (2006.01)
*C08G 77/38* (2006.01)

(52) U.S. Cl. ........ 156/325; 156/329; 525/101; 525/474; 525/477

(58) Field of Classification Search ................. 156/325, 156/329; 525/101, 474, 477
See application file for complete search history.

(56) References Cited

U.S. PATENT DOCUMENTS

| 4,082,894 A * | 4/1978 | Yoshida | 428/335 |
| 5,234,718 A * | 8/1993 | Mino et al. | 427/352 |
| 6,316,057 B1 * | 11/2001 | Hirayama et al. | 427/400 |
| 2003/0027920 A1 * | 2/2003 | Kinoshita et al. | 524/508 |
| 2004/0211511 A1 * | 10/2004 | Suzuki | 156/273.3 |

FOREIGN PATENT DOCUMENTS

| JP | A-2006-198767 | 8/2006 |
| JP | A-2008-156592 | 7/2008 |

OTHER PUBLICATIONS

Ogawa et al., "Molecular Weight Dependence of Adhesive Strength in Plasma Treated Low Density Poly(ethylene) Sheet with Poly(ethylene Terephthalate) Film," *The Adhesion Society of Japan*, 2005, vol. 41, No. 1, pp. 4-10.

Gerenser, "XPS studies of in situ plasma-modified polymer surfaces," 1993, vol. 7, No. 10, pp. 1019-1040.

* cited by examiner

*Primary Examiner* — Philip Tucker
*Assistant Examiner* — Michael Orlando
(74) *Attorney, Agent, or Firm* — Oliff & Berridge, PLC

(57) ABSTRACT

A base material for adhesion to be adhered to a solid body comprising;

a substrate made from metal, polymer resin, glass or ceramics whose surface is adhesive to the solid body by silyl-ether-linkage that at least one active silyl group selected from the group consisting of a hydrosilyl-containing silyl group, a vinyl-containing silyl group, an alkoxysilyl-containing silyl group and a hydrolytic group-containing silyl group having reactivity with a reactive group on the surface of the solid body is bound to a dehydrogenated residue of hydroxyl group on the surface of the substrate.

8 Claims, 2 Drawing Sheets

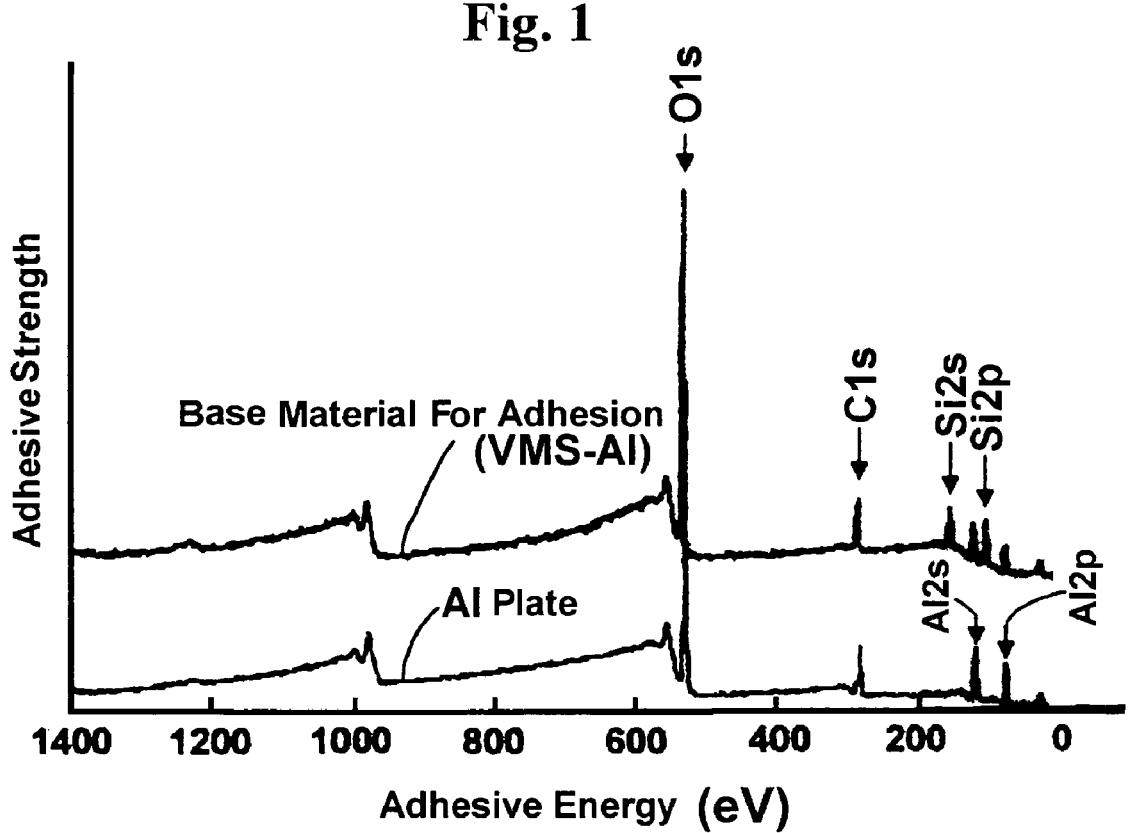
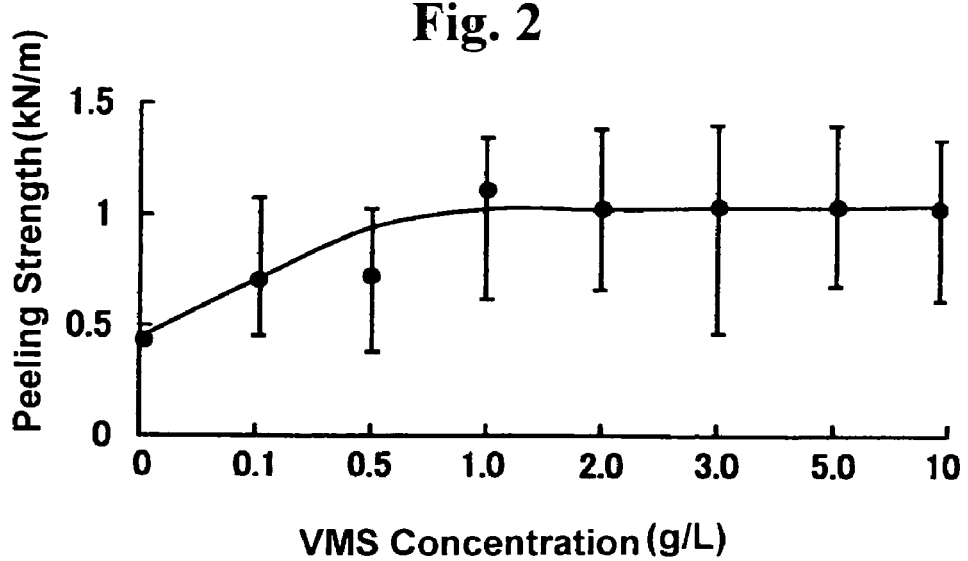

BASE MATERIAL FOR ADHESION AND SILICONE RUBBER-ADHERED ARTICLE USING THEREOF

TECHNICAL FIELD

The present invention relates to a substrate made from metal, polymer resin, glass or ceramics whose surface is prepared to be adhesive to silicone rubber, and an adhesive article of the substrate and the silicone rubber.

BACKGROUND ART

For adhering an adherend material made from a hard raw material such as metal or ceramics and an adhesive material made from a soft raw material such as silicone rubber, physical adhesion by molecular interaction on the adhesive interface of the materials or chemical adhesion by formation of chemical bond thereon is performed.

As such physical adhesive method, a mechanical adhesive method in which the texture of the surface of an adherend material is roughened in order to increase its contacting area to an adhesive material is known. As such chemical adhesive method, an adhesive method using an adhesive agent in which a heat-hardening adhesive agent is applied to an adherend material and then an adhesive material is pressed against the adherend material is known. A surface treatment method in which a reactive group is introduced onto the surface of an adherend material by the surface treatment and then the adherend material binds chemically to the surface molecule of an adhesive material is also known as another chemical adhesive method. Also, Japanese Patent Provisional Publication No. 2006-198797 discloses another method of improving the reactivity of vinyl group with silicone rubber by a treatment of applying a vinyl compound to the surface of metal. In addition, it is also known as another method that liquid composition for silicone rubber of vinyl group-containing polysiloxane, hydrosilyl group-containing polysiloxane and a silane coupling agent such as platinum catalyst suspension is applied to the surface of platy a metal, which is washed with detergent, in order to harden the liquid composition to generate thereof as silicone rubber and simultaneously the silicone rubber is adhered to the metal.

An adhesive article prepared by the mechanical adhesive method comes unstuck easily. Adhesive strength of an adhesive article prepared by the adhesive method using the adhesive agent decreases due to deterioration of the adhesive agent caused by hard heat cycle or elapse of long time because the adherend material and the adhesive material are not chemically-bound on the interface thereof directly. While an adhesive article prepared by the surface treatment method is generally able to accomplish relatively strong adhesive strength by the formation of only two to four chemical bonds per 10,000 atoms on the surface of the adherend material and also the adhesive strength thereof does not receive environmental influence by temperature or solvent, it is difficult to definitively form chemical bond on the interface of the adherend material and the adhesive material and therefore a choice of a raw material for these materials is highly limited. Consequently, the surface treatment method lucks versatility.

In these conventional adhesive methods, if the adhesive material is made from silicone rubber, not only the intensity thereof is weak, but also adhering an adherend material and the adhesive material is difficult and, even if the materials are adherend, the adhesive strength thereof is weak. This is because the reactivity or the interaction of the silicone rubber with the surface of the adherend material on the interface thereof is poor. Therefore, it is necessary to adhere the silicone rubber of the adhesive material and the surface of the adherend material by an adhesive agent that well interacts with silicone rubber. However, the adhesive strength thereof is still not so sufficient.

Moreover, since thickness of the adhesive layer of the above-mentioned case is generally several μm to hundreds μm, the adhesive layer is capable of dispersing the stress from being pulled or bent but incapable of accomplishing sufficient adhesive strength as the amount of the adhesive agent thereof is too small. However, if the amount of the adhesive agent is increased to make the adhesive layer thicker, it results in strain concentration due to the stress that causes detachment of the materials, and the adhesive strength thereof decreases. It is difficult to balance the dispersion and concentration of stress by conditioning the amount of the adhesive agent in case of using an adhesive base material made from silicone rubber.

Furthermore, it is difficult to mutually adhere very small materials by the adhesive method using an adhesive agent.

SUMMARY OF THE INVENTION

The present invention has been developed to solve the foregoing problems. It is an object of the present invention to provide a simple base material for adhesion to prepare a silicone rubber-adhered article that does not come unstuck easily or split off even being pulled or bent, by firmly adhering an adhesive base blanket made from silicone rubber and a substrate made from metal, polymer resin, glass or ceramics without any thick adhesive layer.

A base material for adhesion to be adhered to a solid body of the present invention developed for accomplishing the foregoing objects comprises a substrate made from metal, polymer resin, glass or ceramics whose surface is adhesive to the solid body by silyl-ether-linkage that at least one active silyl group selected from the group consisting of a hydrosilyl-containing silyl group, a vinyl-containing silyl group, an alkoxysilyl-containing silyl group and a hydrolytic group-containing silyl group having reactivity with a reactive group on the surface of the solid body is bound to a dehydrogenated residue of hydroxyl group on the surface of the substrate.

The hydroxyl group of the base material for adhesion is inherent hydroxyl group on the surface of the substrate or a generated hydroxyl group thereon by corona discharge treatment, atmospheric-pressure plasma treatment or ultraviolet irradiation treatment, and is bound to the active silyl group from an alkoxysilyl group of an alkoxysilane compound through the silyl-ether-linkage.

The surface of the solid body toward the base material for adhesion has hydroxyl group by oxidation, and said hydroxyl group is bound to the active silyl group from the alkoxysilyl group through the silyl-ether-linkage.

The silyl-ether-linkage from the alkoxysilane compound of the base material for adhesion constitutes a monomolecular layer.

The active silyl group of the base material for adhesion is;
the hydrosilyl-containing silyl group selected from a monohydrosilyl-containing silyl group and a dihydrosilyl-containing silyl group;
the vinyl-containing silyl group as a vinylsilyl-containing silyl group;
the alkoxysilyl-containing silyl group selected from a terminal-trialkoxysilyl-containing silyl group and a terminal-dialkoxysilyl-containing silyl group; or
the hydrolytic group-containing silyl group having a hydrolysable functional group selected from an acyloxysilyl group, an alkenyloxysilyl group, an alkaniminooxysilyl group, an alkyloxysilyl group, an alkylaminosilyl group, a dialkylaminosilyl group, a nitrogenous heterocyclic substituted silyl group and an arylaminosilyl group.

The active silyl group of the base material for adhesion is the hydrosilyl-containing silyl group having —SiH($R^1$)$_2$ group or —SiH$_2$($R^2$) group on the terminal thereof in which $R^1$ and $R^2$ are an alkyl group having 1 to 4 carbon atoms, or —SiH— group between both terminals thereof.

The active silyl group of the base material for adhesion may be the vinylsilyl-containing silyl group having —Si—$R^3$ group on the terminal thereof in which $R^3$ is a vinyl-containing group, or —Si($R^4$)— group between both terminals thereof in which $R^4$ is a vinyl-containing group.

The active silyl group of the base material for adhesion may be the terminal-alkoxysilyl-containing silyl group having —Si(O$R^5$)$_2R^6$ group on the terminal thereof in which $R^5$ and $R^6$ are a alkyl group having 1 to 4 carbon atoms, or —Si(O$R^7$)$_3$ group on the terminal thereof in which $R^7$ is a alkyl group having 1 to 4 carbon atoms.

The active silyl group of the base material for adhesion may be the hydrolytic group-containing silyl group having the hydrolysable functional group represented by —Si($R^8$)$_a$($R^9$)$_{3-a}$ group in which $R^8$ is selected from hydrogen atom; a halogen atom; an alkyl group, an alkenyl group, an alkyloxy group and a fluoro-substituted alkyl group that respectively have 1 to 12 carbon atoms; an aralkyl group; and aryl group, $R^9$ is selected from an acyloxy group, an alkenyloxy group, an alkaniminooxy group, an alkyloxy group, an alkylamino group and a dialkylamino group that respectively have 1 to 12 carbon atoms; a nitrogenous heterocyclic group and an arylamino group, and a is a number of 0 to 3.

The reactive group of the base material for adhesion is at least one selected from the group consisting of hydrosilyl, vinylsilyl, hydroxysilyl, alkyloxysilyl, alkenyloxysilyl, acyloxysilyl, iminooxysilyl and alkylaminosilyl.

The active silyl group is the vinyl-containing silyl group, a platinum-containing catalyst or a rhodium-containing catalyst that is applied on the surface of the substrate which exposes the active silyl group, and the reactive group of hydrosilyl.

The platinum-containing catalyst is a platinum complex and the rhodium-containing catalyst of a rhodium complex.

The platinum-containing catalyst or the rhodium-containing catalyst is applied on the surface of the substrate by coating or immersing with a solution or a suspension including thereof.

Platinum atom of the platinum-containing catalyst or rhodium atom of the rhodium-containing catalyst coordinates with plural groups of the vinyl-containing silyl group.

The vinyl-containing silyl group that is derived from a vinyl-containing silyl compound selected from (CH$_2$=CH—)(CH$_3$O—)$_2$Si—O—[(CH$_2$=CH—)(CH$_3$O—)Si—O]$_{b1}$—Si(—OCH$_3$)$_2$(—CH=CH$_2$) in which b1 is a number of 0 to 100, (CH$_2$=CH—)(C$_2$H$_5$O—)$_2$Si—O—[(CH$_2$=CH—)(C$_2$H$_5$O—)Si—O]$_{b2}$—Si(—OC$_2$H$_5$)$_2$(—CH=CH$_2$) in which b2 is a number of 0 to 100, or (CH$_2$=CH—)(C$_3$H$_7$O—)$_2$Si—O—[(CH$_2$=CH—)(C$_3$H$_7$O—)Si—O]$_{b3}$—Si(—OC$_3$H$_7$)$_2$(—CH=CH$_2$) in which b3 is a number of 1 to 100.

The solid body is made from silicone rubber or silicone resin.

A silicone rubber-adhered article comprises;
the above-mentioned base material for adhesion and
an adhesive silicone rubber blanket made from polysiloxane, vinyl silicone and/or silanol silicone that is adhered to the surface of the substrate of the adhesive base material.

The silicone rubber-adhered article comprises plural base materials for adhesion that are adhered through the adhesive silicone rubber blanket which is granular, textile, membranous, filmy or plate-like.

The silicone rubber-adhered article comprises;
the polysiloxane represented by H(CH$_3$)$_2$SiO[SiH(CH$_3$)O]$_c$[Si($R^{11}$)$R^{12}$O]$_d$Si(CH$_3$)$_2$H in which $R^{11}$ and $R^{12}$ are an alkyl group, an alkenyl group, an alkyloxy group or a fluoro-substituted alkyl group that respectively have 1 to 12 carbon atoms; an aralkyl group; an aryl group; or HSi(CH$_3$)$_2$O—, c is a number of 1 to 80, and d is a number of 0 to 80, the vinyl silicone represented by CH$_2$=CH(CH$_3$)$_2$SiO[SiCH=CH$_2$(CH$_3$)O]$_e$[Si($R^{13}$)$R^{14}$O]$_f$Si(CH$_3$)$_2$CH=CH$_2$ in which $R^{13}$ and $R^{14}$ are an alkyl group, an alkenyl group, an alkyloxy group or a fluoro-substituted alkyl group that respectively have 1 to 12 carbon atoms; an aralkyl group; or an aryl group, e is a number of 1 to 80, and f is a number of 0 to 80, the silanol silicone represented by A-(CH$_3$)$_2$SiO[Si(CH$_3$)$_2$O]$_g$[Si($R^{15}$)$R^{16}$O]$_h$Si(CH$_3$)$_2$-A in which $R^{15}$ and $R^{16}$ are an alkyl group, an alkenyl group, an alkyloxy group or a fluoro-substituted alkyl group that respectively have 1 to 12 carbon atoms; an aralkyl group; or an aryl group, A is hydroxyl group, an alkyloxy group, an alkenyloxy group, an aryloxy group, an acyloxy group that respectively have 1 to 4 carbon atoms, an iminooxy group, or an amino group, g is a number of 1 to 80, and h is a number of 0 to 80.

A method for manufacturing the silicone rubber-adhered article comprising steps of:
applying a composition including silicone rubber component of polysiloxane, vinyl silicone and/or silanol silicone to the surface of the substrate of the base material for adhesion,
hardening the composition at room temperature or by heating to form an adhesive silicone rubber blanket and to adhere the surface of the substrate with the adhesive silicone rubber blanket.

In the method for manufacturing the silicone rubber-adhered article, the composition includes a cross-linking agent and/or a cross-linking catalyst.

By introducing hydroxyl group onto the surface of a substrate made from metal, polymer resin, glass or ceramics to chemically bind the hydroxyl group and an active silyl group derived from an alkoxysilane compound through silyl-ether-linkage, the base material for adhesion of the present invention easily and firmly adheres to the silicone rubber blanket through crosslinkage.

By the silyl-ether-linkage, an infinitely thin monomolecular layer of a silyl ether is constituted on the substrate. The layer is chemically stable, and despite of its thinness, the surface thereof is modified to be adhered firmly to silicone rubber. Moreover, the layer is stable for a long period of time, and by the crosslinkage with silicone rubber or the interaction therewith, a solid silicone rubber-adhered article that does not come unstuck easily can be obtained through the layer.

Especially, when the base material for adhesion comprises a substrate, of which a vinyl-containing silyl group of an active silyl group is bound to the surface through the silyl-ether-linkage, and a platinum-containing catalyst or a rhodium-containing catalyst is applied thereto, a silicone rubber-adhered article that the base material for adhesion and an adhesive hydrosilyl-containing silicone rubber blanket are firmly adhered can be obtained.

BRIEF EXPLANATION OF THE DRAWINGS

FIG. 1 is a chart of the surface analysis of the base material for adhesion, to which the present invention is applied, measured by X-ray photoelectron spectroscopy (XPS analysis).

FIG. 2 is a graph of the correlation of the concentration of vinylmethoxysiloxane, in which the base material for adhesion is immersed at the time of manufacturing a silicone rubber-adhered article, and peeling strength of the obtained silicone rubber-adhered article.

DETAILED EXPLANATION OF THE INVENTION

Figure 3:
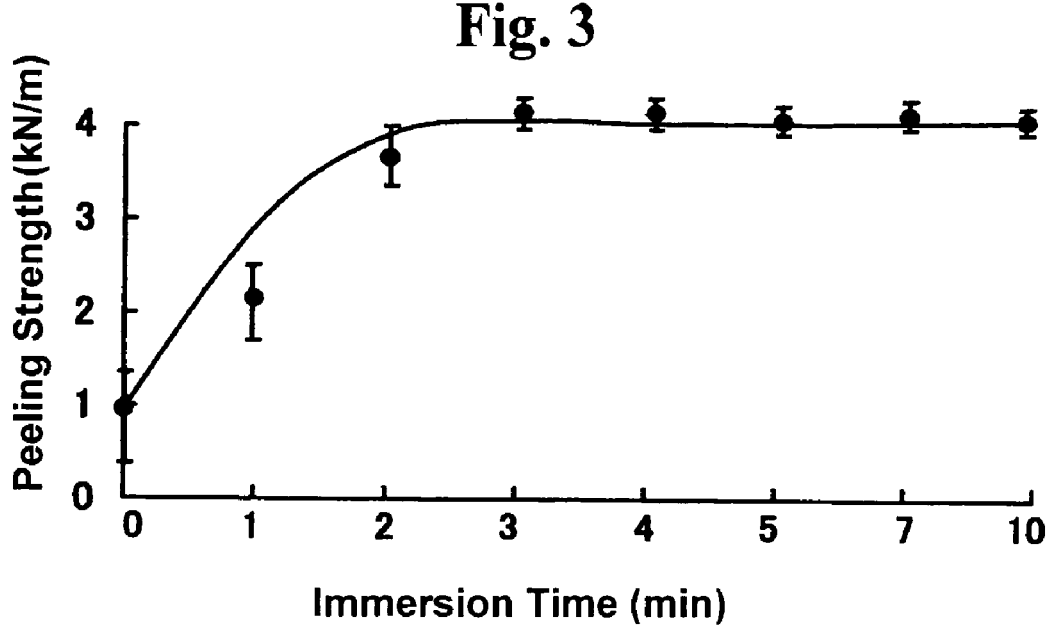
FIG. 3 is a graph of the correlation of immersion time of a platinum-containing catalyst suspension, in which the base material for adhesion is immersed at the time of manufacturing a silicone rubber-adhered article, and peeling strength of the obtained silicone rubber-adhered article.

According to the method for manufacturing such silicone rubber-adhered article, despite of its size, the silicone rubber-adhered article can be mass-produced with simple procedures.

Hereunder, embodiments of the present invention are explained in detail. The present invention is not intended to be limited.

A base material for adhesion of the present invention such as the silicone rubber-adhesive base material is manufactured as follows.

The surface of a substrate of a base material for adhesion made from metal is treated by corona discharge treatment to generate hydroxyl group derived from a metal oxide molecule on the surface thereof, and the surface with crosslinking-reactivity to silicone rubber is obtained. When any impurity such as an organic substance is attached onto the surface thereof, the impurity is oxidized by corona discharge treatment, and carboxyl group derived from the organic substance is generated on the surface thereof. As a result, the surface with crosslinking-reactivity to silicone rubber on which hydroxyl group generated from the carboxyl group is obtained.

Meanwhile, mixture of a solvent and a functional alkoxysilyl compound such as $HSi(CH_3)_2OSi(CH_3)_2CH_2CH_2CH_2Si(OC_2H_5)_3$ that reacts with the hydroxyl group and generates a silyl ether is applied onto the surface of the substrate on which the hydroxyl group is already generated, and then the surface thereof is dried and heated. Triethoxysilyl group of the functional alkoxysilyl compound reacts with the hydroxyl group on the surface of the substrate to be the active silyl group and generates a chemically strong silyl-ether-linkage with a dehydrogenated residue of hydroxyl group. By the alkoxysilyl compound, a silicone rubber-adhesive base material that is coated by a monomolecular layer of a silyl ether to which silyl group such as a hydrosilyl-containing silyl group is bound through ether-linkage.

Such monomolecular layer is constituted by a molecular chain that does not exceed the base unit of the first silyl compound.

After a composition including silicone rubber component is applied onto the surface of the silicone rubber-adhesive base material and hardened thereof to form an adhesive silicone rubber blanket thereon, a silicone rubber-adhered article that the adhesive silicone rubber blanket is adhered to a monomolecular layer of a silyl ether on the surface of the silicone rubber-adhesive base material by cross-linkage is obtained. The silyl ether molecule on the surface thereof and the adhesive silicone rubber blanket are firmly adhered because the silyl ether molecule and the silicone rubber component are crosslinked by covalent-bond, or each of the silyl group thereof is attracted and intracted each other, and crosslinked electrochemically. This allows us to assume that the silicone rubber-adhered article of the above has sufficient adhesive strength and does not come unstuck easily.

Examples of the silicone rubber-adhesive base material that the silyl group such as a hydrosilyl-containing silyl group is bound to the surface thereof through silyl-ether-linkage were explained above. The surface of the base material can be the surface to which an active silyl group of a vinyl-containing silyl group, a terminal-alkoxylsilyl-containing silyl group or a hydrolyzable group-containing silyl group which are respectively represented by a vinylsilyl-containing silyl group are bound through silyl-ether-linkage.

Each of such active silyl group is generated by the reaction of the alkoxysilyl group of the functional alkoxylsilyl compound with the hydroxyl group on the surface of the substrate of the base material for adhesion.

The silyl-ether-linkage generated on the surface of the substrate (ie. Sub.) of the base material for adhesion by the hydrosilyl-containing silyl group is represented by the following chemical formula (1).

$$\text{Sub.-O—SiR}^{20} \tag{1}$$

In the chemical formula (1), $R^{20}$ in the hydrosilyl-containing silyl group $-SiR^{20}$ has $-SiH(R^1)_2$ group or $-SiH_2(R^2)$ group on the terminal thereof in which $R^1$ and $R^2$ are an alkyl group having 1 to 4 carbon atoms, or $-SiH-$ group between both terminals thereof. $R^{20}$ can be polysiloxy group.

Concretely, $-SiR^{20}$ is represented by the group consisting of

—$(C_2H_5O)_2SiCH_2CH_2CH_2Si(CH_3)_2H$,
—$(CH_3O)_2SiCH_2CH_2CH_2Si(CH_3)_2H$,
-(i-$C_3H_7O)_2SiCH_2CH_2CH_2Si(CH_3)H_2$,
-(n-$C_3H_7O)_2SiCH_2CH_2CH_2Si(CH_3)_2OSi(CH_3)_2CH_2CH_2Si(CH_3)_2Si(CH_3)_2H$,
-(n-$C_4H_9O)_2SiCH_2CH_2CH_2Si(CH_3)_2OSi(CH_3)_2H$,
-(t-$C_4H_9O)_2SiCH_2CH_2CH_2Si(CH_3)_2OSi(CH_3)_2H$,
—$(C_2H_5O)CH_3SiCH_2CH_2CH_2Si(CH_3)_2OSi(CH_3)_2H$,
—$(CH_3O)CH_3SiCH_2CH_2CH_2Si(CH_3)_2OSi(CH_3)_2CH_2CH_2CH_2Si(CH_3)_2Si(CH_3)_2H$,
—$(CH_3)_2SiCH_2CH_2CH_2Si(CH_3)_2OSi(CH_3)_2H$,
—$(C_2H_5O)_2SiCH_2CH_2CH_2Si(CH_3)_2OSi(CH_3)_2H$,
-(n-$C_3H_7)_2SiCH_2CH_2CH_2Si(CH_3)_2OSi(CH_3)_2H$,
-(i-$C_3H_7O)_2SiCH_2CH_2CH_2Si(CH_3)_2OSi(CH_3)_2H$,
-(n-$C_4H_9)_2SiCH_2CH_2CH_2Si(CH_3)_2OSi(CH_3)_2H$,
-(t-$C_4H_9O)_2SiCH_2CH_2CH_2Si(CH_3)_2OSi(CH_3)_2H$,
—[(—O)(-)$SiCH_2CH_2CH_2Si(CH_3)_2OSi(CH_3)_2H]_{k1}$,
—[(—O)(-)$SiCH_2CH_2Si(CH_3)_2OSi(CH_3)_2H]_{k2}$,
—[(—O)(-)$SiCH_2CH_2CH_2CH_2Si(CH_3)_2OSi(CH_3)_2H]_{k3}$,
—[(—O)(-)$SiCH_2CH_2CH_2CH_2CH_2CH_2Si(CH_3)_2OSi(CH_3)_2H]_{k4}$,
—[(—O)(-)$SiCH_2CH_2CH_2CH_2CH_2CH_2CH_2CH_2CH_2CH_2Si(CH_3)_2OSi(CH_3)_2H]_{k5}$,
—$(CH_3O)_2SiCH_2C_6H_4CH_2CH_2Si(CH_3)_2C_6H_4Si(CH_3)_2H$,
—$(CH_3O)CH_3SiCH_2C_6H_4CH_2CH_2Si(CH_3)_2C_6H_4Si(CH_3)_2H$,
—$(CH_3)_2SiCH_2C_6H_4CH_2CH_2Si(CH_3)_2C_6H_4Si(CH_3)_2H$,
—[(—O)(-)$SiCH_2C_6H_4CH_2CH_2Si(CH_3)_2C_6H_4Si(CH_3)_2H]_{k6}$,
—[(—O)(-)$SiCH_2CH_2CH_2Si(CH_3)_2C_6H_4OC_6H_4Si(CH_3)_2H]_{k7}$,
—[(—O)(-)$SiCH_2CH_2CH_2Si(CH_3)_2C_2H_4Si(CH_3)_2H]_{k8}$,

—(C₂H₅O)₂SiCH₂CH₂CH₂Si(CH₃)₂O[Si(CH₃)₂O]$_{m1}$Si(CH₃)₂H,

—(C₂H₅)₂SiCH₂CH₂CH₂Si(CH₃)₂O[Si(CH₃)₂O]$_{m2}$Si(C₂H₅)₂H,

—(C₂H₅O)CH₃SiCH₂CH₂CH₂Si(CH₃)₂O[Si(CH₃)₂O]$_{m3}$Si(CH₃)₂H, (CH₃)₃SiO[—Si(CH₃)]O[SiH(CH₃)O]$_{m4}$Si(CH₃)₃, (CH₃)₃SiO[(—Si(CH₃)CH₂CH₂CH₂)(-)SiCH₃]O[SiH(CH₃)O]$_{m5}$Si(CH₃)₃, (CH₃)₃SiO[(—Si(OCH₃)CH₂CH₂CH₂)(-)SiCH₃]O[SiH(CH₃)O]$_{m6}$Si(CH₃)₃, (CH₃)₃SiO[(—Si(CH₃)CH₂CH₂CH₂)(-)SiCH₃]O[SiH(CH₃)O]$_{m7}$Si(CH₃)₃, (CH₃)₃SiO[(—Si(O—)CH₂CH₂CH₂)SiCH₃]O[SiH(CH₃)O]$_{m8}$Si(CH₃)₃, (CH₃)₃SiO[(—Si(CH₃)O[SiH(CH₃)O]$_{m9}$[Si(CH₃)₂O]$_{n1}$Si(CH₃)₃, (CH₃)₃SiO[(—Si(CH₃)CH₂CH₂CH₂CH₂CH₂)(-)SiCH₃)O][SiH(CH₃)O]$_{m10}$[Si(CH₃)₂O]$_{n2}$Si(CH₃)₃, (CH₃)₃SiO[(—Si(OCH₃)CH₂CH₂CH₂CH₂CH₂)(-)SiCH₃)O][SiH(CH₃)O]m$_{11}$[Si(CH₃)₂O]$_{n3}$Si(CH₃)₃, (CH₃)₃SiO[(—Si(O—)CH₂CH₂CH₂CH₂CH₂)Si(CH₃)O][SiH(CH₃)O]$_{m12}$[Si(CH₃)₂O]$_{n4}$Si(CH₃)₃, (CH₃)₃SiO[(—Si(OCH₃)CH₂CH₂CH₂CH₂CH₂)(-)Si(CH₃)O][SiH(CH₃)O]$_{m13}$[Si(CH₃)₂O]$_{n5}$Si(CH₃)₃, (CH₃)₃SiO[—Si(C₂H₅)O][SiH(C₂H₅)O]$_{m14}$Si(CH₃)₃, (CH₃)₃SiO[(—Si(O—)CH₂CH₂CH₂CH₂CH₂)Si(C₂H₅)]O[SiH(C₂H₅)O]$_{m15}$Si(CH₃)₃, (CH₃)₃SiO[(—Si(CH₃)CH₂CH₂CH₂CH₂CH₂)(-)Si(C₂H₅)]O[SiH(C₂H₅)O]$_{m16}$Si(CH₃)₃,

—Si(CH₃)₂CH₂CH₂CH₂CH₂CH₂CH₂(CH₃)₂SiO[HSi(CH₃)₂OSiC₆H₅O]$_{m17}$Si(CH₃)₂H,

—Si(OCH₃)₂CH₂CH₂CH₂CH₂CH₂CH₂(CH₃)₂SiO[HSi(CH₃)₂OSiC₆H₅O]$_{m18}$Si(CH₃)₂H,

—Si(O—)CH₂CH₂CH₂CH₂CH₂CH₂(CH₃)₂SiO[HSi(CH₃)₂OSiC₆H₅O]$_{m19}$Si(CH₃)₂H,

H(CH₃)₂SiO[(—Si(CH₃)₂CH₂CH₂CH₂)Si(CH₃)O][HSiCH₃O]$_{m20}$Si(CH₃)₂H,

H(CH₃)₂SiO[(—Si(CH₃)₂CH₂CH₂CH₂CH₂)Si(CH₃)O][HSiCH₃O]$_{m21}$Si(CH₃)₂H,

H(CH₃)₂SiO[(—Si(CH₃)₂CH₂CH₂CH₂CH₂CH₂)Si(CH₃)O][HSiCH₃O]$_{m22}$Si(CH₃)₂H,

H(CH₃)₂SiO[(—Si(CH₃)₂CH₂CH₂CH₂CH₂CH₂CH₂CH₂)Si(CH₃)O][HSiCH₃O]$_{m23}$Si(CH₃)₂H,

H(CH₃)₂SiO[(—Si(CH₃)₂CH₂CH₂CH₂CH₂CH₂CH₂CH₂CH₂CH₂)Si(CH₃)O][HSiCH₃O]$_{m24}$Si(CH₃)₂H,

H(CH₃)₂SiO[(—Si(OCH₃)₂CH₂CH₂C₆H₄CH₂CH₂)Si(CH₃)O][HSiCH₃O]$_{m25}$Si(CH₃)₂H,

H(CH₃)₂SiO[(—Si(OCH₃)₂CH₂C₆H₄CH₂CH₂CH₂)Si(CH₃)O][HSiCH₃O]$_{m26}$Si(CH₃)₂H,

H(CH₃)₂SiO[(—Si(OCH₃)₂CH₂C₆H₄CH₂CH₂)Si(CH₃)O][HSiCH₃O]$_{m27}$Si(CH₃)₂H,

H(CH₃)₂SiO[(—Si(OCH₃)₂C₆H₄CH₂CH₂)Si(CH₃)O][HSiCH₃O]$_{m28}$Si(CH₃)₂H,

H(CH₃)₂SiO[(—Si(OCH₃)₂CH₂CH₂CH₂)Si(CH₃)O][HSiCH₃O]$_{m29}$Si(CH₃)₂H,

H(CH₃)₂SiO[(—Si(OCH₃)₂CH₂CFH₂CH₂CH₂)Si(CH₃)O][HSiCH₃O]$_{m30}$Si(CH₃)₂H,

H(CH₃)₂SiO[(—Si(OCH₃)₂CH₂CH₂CH₂CH₂CH₂)Si(CH₃)O][HSiCH₃O]$_{m31}$Si(CH₃)₂H,

H(CH₃)₂SiO[(—Si(OCH₃)₂CH₂CH₂CH₂CH₂CH₂CH₂CH₂)Si(CH₃)O][HSiCH₃O]$_{m32}$Si(CH₃)₂H,

H(CH₃)₂SiO[(—Si(OCH₃)₂CH₂CH₂CH₂CH₂CH₂CH₂CH₂CH₂CH₂)Si(CH₃)O][HSiCH₃O]$_{m33}$Si(CH₃)₂H,

H(CH₃)₂SiO[(—Si(OCH₃)₂CH₂CH₂C₆H₄CH₂CH₂)Si(CH₃)O][HSiCH₃O]$_{m34}$Si(CH₃)₂H,

H(CH₃)₂SiO[(—Si(OCH₃)₂CH₂C₆H₄CH₂CH₂CH₂)Si(CH₃)O][HSiCH₃O]$_{m35}$Si(CH₃)₂H,

H(CH₃)₂SiO[(—Si(OCH₃)₂CH₂C₆H₄CH₂CH₂)Si(C₁H₃)O][HSiCH₃O]$_{m36}$Si(CH₃)₂H,

H(CH₃)₂SiO[(—Si(OCH₃)₂C₆H₄CH₂CH₂)Si(CH₃)O][HSiCH₃O]$_{m37}$Si(CH₃)₂H,

H(CH₃)₂SiO[(—Si(O—)CH₂CH₂C₆H₄CH₂CH₂)Si(CH₃)O][HSiCH₃O]$_{m38}$Si(CH₃)₂H,

H(CH₃)₂SiO[(—Si(O—)CH₂C₆H₄CH₂CH₂CH₂)Si(CH₃)O][HSiCH₃O]$_{m39}$Si(CH₃)₂H,

H(CH₃)₂SiO[(—Si(O—)CH₂C₆H₄CH₂CH₂)Si(CH₃)O][HSiCH₃O]$_{m40}$Si(CH₃)₂H,

H(CH₃)₂SiO[(—Si(O—)C₆H₄CH₂CH₂)Si(CH₃)O][HSiCH₃O]$_{m41}$Si(CH₃)₂H,

H(CH₃)₂SiO[(—Si(O—)CH₂CH₂CH₂)Si(CH₃)O][HSiCH₃O]$_{m42}$Si(CH₃)₂H,

H(CH₃)₂SiO[(—Si(O—)CH₂CH₂CH₂CH₂)Si(CH₃)O][HSiCH₃O]$_{m43}$Si(CH₃)₂H,

H(CH₃)₂SiO[(—Si(O—)CH₂CH₂CH₂CH₂CH₂)Si(CH₃)O][HSiCH₃O]$_{m44}$Si(CH₃)₂H,

H(CH₃)₂SiO[(—Si(O—)CH₂CH₂CH₂CH₂CH₂CH₂CH₂CH₂)Si(CH₃)O][HSiCH₃O]$_{m45}$Si(CH₃)₂H,

H(CH₃)₂SiO[(—Si(O—)CH₂CH₂CH₂CH₂CH₂CH₂CH₂CH₂CH₂CH₂)Si(CH₃)O][HSiCH₃O]$_{m46}$Si(CH₃)₂H,

H(CH₃)₂SiO[(—Si(O—)CH₂CH₂C₆H₄CH₂CH₂)Si(CH₃)O][HSiCH₃O]$_{m47}$Si(CH₃)₂H,

H(CH₃)₂SiO[(—Si(O—)CH₂C₆H₄CH₂CH₂CH₂)Si(CH₃)O][HSiCH₃O]$_{m48}$Si(CH₃)₂H,

H(CH₃)₂SiO[(—Si(O—)CH₂C₆H₄CH₂CH₂)Si(CH₃)O][HSiCH₃O]$_{m49}$Si(CH₃)₂H,

H(CH₃)₂SiO[(—Si(O—)C₆H₄CH₂CH₂)Si(CH₃)O][HSiCH₃O]$_{m50}$Si(CH₃)₂H,

H(CH₃)₂SiO[(-)Si(CH₃)CH₂CH₂CH₂CH₂CH₂Si(CH₃)₂OSiC₆H₅O]$_{m51}$[HSi(CH₃)₂OSiC₆H₅O]$_{n6}$Si(CH₃)₂H,

H(CH₃)₂SiO[(-)Si(OCH₃)CH₂CH₂CH₂CH₂CH₂CH₂Si(CH₃)₂OSiC₆H₅O]$_{m52}$[HSi(CH₃)₂OSiC₆H₅O]$_{n7}$Si(CH₃)₂H,

H(CH₃)₂SiO[(-)Si(O—)CH₂CH₂CH₂CH₂CH₂CH₂Si(CH₃)₂OSiC₆H₅O]$_{m53}$[HSi(CH₃)₂OSiC₆H₅O]$_{n8}$Si(CH₃)₂H,

—(CH₃)₂SiO[SiH(CH₃)O]$_{m54}$[SiCH₃(C₆H₅)O]$_{n9}$Si(CH₃)₂H,

—Si(OC₂H₅)₂CH₂CH₂CH₂CH₂CH₂CH₂(CH₃)₂SiO[SiH(CH₃)O]$_{m55}$[SiCH₃(C₆H₅)O]$_{n10}$Si(CH₃)₂H,

—Si(O—)CH₂CH₂CH₂CH₂CH₂CH₂(CH₃)₂SiO[SiH(CH₃)O]$_{m56}$[SiCH₃(C₆H₅)O]$_{n11}$Si(CH₃)₂H,

—Si(CH₃)₂CH₂CH₂CH₂CH₂CH₂CH₂(CH₃)₂SiO[SiH(CH₃)O]$_{m57}$[SiCH₃(C₆H₅)O]$_{n12}$Si(CH₃)₂H,

H(CH₃)₂SiO(-)Si(CH₃)O[SiH(CH₃)O]$_{m58}$[SiCH₃(C₆H₅)O]$_{n13}$Si(CH₃)₂H,

H(CH₃)₂SiO[(-)Si(OC₂H)₂CH₂CH₂CH₂Si(CH₃)]O[SiH(CH₃)O]$_{m59}$[SiCH₃(C₆H₅)O]$_{n14}$Si(CH₃)₂H,

H(CH₃)₂SiO[(-)Si(O—)CH₂CH₂CH₂Si(CH₃)]O[SiH(CH₃)O]$_{m60}$[SiCH₃(C₆H₅)O]$_{n15}$Si(CH₃)₂H, and H(CH₃)₂SiO[(-)Si(CH₃)₂CH₂CH₂CH₂Si(CH₃)]O[SiH(CH₃)O]$_{m61}$[SiCH₃(C₆H₅)O]$_{n16}$Si(CH₃)₂H.

In the above-mentioned groups, k1 to k8, m1 to m61, and n1 to n16 are a number of 1 to 100. It is preferable that one group thereof has 1 to 99 hydrosilyl groups (i.e. SiH groups).

Examples of the functional alkoxysilyl compound that generates the hydrosilyl-containing silyl group are as follows.

$(CH_3O)_3SiCH_2CH_2CH_2Si(CH_3)_2OSi(CH_3)_2H$,
$(C_2H_5O)_3SiCH_2CH_2CH_2Si(CH_3)_2OSi(CH_3)_2H$,
$(CH_3O)_3SiCH_2CH_2CH_2Si(OCH_3)_2OSi(OCH_3)_3$,
$(C_2H_5O)_3SiCH_2CH_2CH_2Si(OCH_3)_2OSi(OCH_3)_3$,
$(C_2H_5O)_3SiCH_2CH_2CH_2Si(CH_3)_2H$,
$(CH_3O)_3SiCH_2CH_2CH_2Si(CH_3)_2H$,
$(i-C_3H_7O)_3SiCH_2CH_2Si(CH_3)H_2$,
$(n-C_3H_7O)_3SiCH_2CH_2CH_2Si(CH_3)_2OSi(CH_3)_2CH_2CH_2Si(CH_3)_2Si(CH_3)_2H$,
$(n-C_4H_9O)_3SiCH_2CH_2CH_2Si(CH_3)_2OSi(CH_3)_2H$,
$(t-C_4H_9O)_3SiCH_2CH_2CH_2Si(CH_3)_2OSi(CH_3)_2H$,
$(C_2H_5O)_2CH_3SiCH_2CH_2CH_2Si(CH_3)_2OSi(CH_3)_2H$,
$(CH_3O)_2CH_3SiCH_2CH_2CH_2Si(CH_3)_2OSi(CH_3)_2CH_2CH_2Si(CH_3)_2Si(CH_3)_2H$,
$CH_3O(CH_3)_2SiCH_2CH_2CH_2Si(CH_3)_2OSi(CH_3)_2H$,
$(C_2H_5O)_3SiCH_2CH_2CH_2Si(CH_3)_2OSi(CH_3)_2H$,
$(n-C_3H_7)_3SiCH_2CH_2CH_2Si(CH_3)_2OSi(CH_3)_2H$,
$(i-C_3H_7O)_3SiCH_2CH_2CH_2Si(CH_3)_2OSi(CH_3)_2H$,
$(n-C_4H_9)_3SiCH_2CH_2CH_2Si(CH_3)_2OSi(CH_3)_2H$,
$(t-C_4H_9O)_3SiCH_2CH_2CH_2Si(CH_3)_2OSi(CH_3)_2H$,
$(C_2H_5O)_3SiCH_2CH_2Si(CH_3)_2OSi(CH_3)_2H$,
$(C_2H_5O)_3SiCH_2CH_2CH_2CH_2Si(CH_3)_2OSi(CH_3)_2H$,
$(C_2H_5O)_3SiCH_2CH_2CH_2CH_2CH_2CH_2Si(CH_3)_2OSi(CH_3)_2H$,
$(C_2H_5O)_3SiCH_2CH_2CH_2CH_2CH_2CH_2CH_2CH_2CH_2Si(CH_3)_2OSi(CH_3)_2H$,
$(CH_3O)_3SiCH_2C_6H_4CH_2CH_2Si(CH_3)_2C_6H_4Si(CH_3)_2H$,
$(CH_3O)_2CH_3SiCH_2C_6H_4CH_2CH_2Si(CH_3)_2C_6H_4Si(CH_3)_2H$,
$CH_3O(CH_3)_2SiCH_2C_6H_4CH_2CH_2Si(CH_3)_2C_6H_4Si(CH_3)_2H$,
$(C_2H_5O)_3SiCH_2C_6H_4CH_2CH_2Si(CH_3)_2C_6H_4Si(CH_3)_2H$,
$(C_2H_5O)_3SiCH_2CH_2CH_2Si(CH_3)_2C_6H_4OC_6H_4Si(CH_3)_2H$,
$(C_2H_5O)_3SiCH_2CH_2CH_2Si(CH_3)_2C_2H_4Si(CH_3)_2H$,
$(C_2H_5O)_3SiCH_2CH_2CH_2Si(CH_3)_2O[Si(CH_3)_2O]_{p1}Si(CH_3)_2H$,
$C_2H_5O(CH_3)_2SiCH_2CH_2CH_2Si(CH_3)_2O[Si(CH_3)_2O]_{p2}Si(C_2H_5)_2H$,
$(C_2H_5O)_2CH_3SiCH_2CH_2CH_2Si(CH_3)_2O[Si(CH_3)_2O]_{p3}Si(CH_3)_2H$,
$(CH_3)_3SiOSiH(CH_3)O[SiH(CH_3)O]_{p4}Si(CH_3)_3$,
$(CH_3)_3SiO[(C_2H_5OSi(CH_3)CH_2CH_2CH_2)SiCH_3]O[SiH(CH_3)O]_{p5}Si(CH_3)_3$,
$(CH_3)_3SiO[(C_2H_5OSiOCH_3CH_2CH_2CH_2)SiCH_3]O[SiH(CH_3)O]_{p6}Si(CH_3)_3$,
$(CH_3)_3SiO[(C_2H_5OSi(CH_3)CH_2CH_2CH_2)SiCH_3]O[SiH(CH_3)O]_{p7}Si(CH_3)_3$,
$(CH_3)_3SiO[(Si(OC_2H_5)_2CH_2CH_2CH_2)SiCH_3]O[SiH(CH_3)O]_{p8}Si(CH_3)_3$,
$(CH_3)_3SiOSi(OC_2H_5)_2O[SiH(CH_3)O]_{p9}[Si(CH_3)_2O]_{q1}Si(CH_3)_3$,
$(CH_3)_3SiO[(C_2H_5OSi(CH_3)CH_2CH_2CH_2CH_2CH_2CH_2)Si(CH_3)O][SiH(CH_3)O]_{p10}[Si(CH_3)_2O]_{q2}Si(CH_3)_3$,
$(CH_3)_3SiO[(Si(OCH_3)_3CH_2CH_2CH_2CH_2CH_2CH_2)Si(CH_3)O][SiH(CH_3)O]_{p11}[Si(CH_3)_2O]_{q3}Si(CH_3)_3$,
$(CH_3)_3SiOSi(OC_2H_5)_2O[SiH(C_2H_5)O]_{p12}Si(CH_3)_3$,
$(CH_3)_3SiO[(Si(OC_2H_5)_2CH_2CH_2CH_2CH_2CH_2)Si(C_2H_5)]O[SiH(C_2H_5)O]_{p13}Si(CH_3)_3$,
$(CH_3)_3SiO[(C_2H_5OSi(CH_3)CH_2CH_2CH_2CH_2CH_2CH_2)Si(C_2H_5)]O[SiH(C_2H_5)O]_{p14}Si(CH_3)_3$,
$C_2H_5OSi(CH_3)_2CH_2CH_2CH_2CH_2CH_2CH_2(CH_3)_2SiO[HSi(CH_3)_2OSiC_6H_5O]_{p15}Si(CH_3)_2H$,
$Si(OCH_3)_3CH_2CH_2CH_2CH_2CH_2(CH_3)_2SiO[HSi(CH_3)_2 OSiC_6H_5O]_{p16}Si(CH_3)_2H$,
$H(CH_3)_2SiO[(C_2H_5OSi(CH_3)_2CH_2CH_2CH_2)Si(CH_3)O][HSiCH_3O]_{p17}Si(CH_3)_2H$,
$H(CH_3)_2SiO[(C_2H_5OSi(CH_3)_2CH_2CH_2CH_2CH_2)Si(CH_3)O][HSiCH_3O]_{p18}Si(CH_3)_2H$,
$H(CH_3)_2SiO[(C_2H_5OSi(CH_3)_2CH_2CH_2CH_2CH_2CH_2CH_2)Si(CH_3)O][HSiCH_3O]_{p19}Si(CH_3)_2H$,
$H(CH_3)_2SiO[(C_2H_5OSi(CH_3)_2CH_2CH_2CH_2CH_2CH_2CH_2CH_2)Si(CH_3)O][HSiCH_3O]_{p20}Si(CH_3)_2H$,
$H(CH_3)_2SiO[(C_2H_5OSi(CH_3)_2CH_2CH_2CH_2CH_2CH_2CH_2CH_2CH_2CH_2)Si(CH_3)O][HSiCH_3O]_{p21}Si(CH_3)_2H$,
$H(CH_3)_2SiO[(Si(OCH_3)_3CH_2CH_2C_6H_4CH_2CH_2)Si(CH_3)O][HSiCH_3O]_{p22}Si(CH_3)_2H$,
$H(CH_3)_2SiO[(Si(OCH_3)_3CH_2C_6H_4CH_2CH_2CH_2)Si(CH_3)O][HSiCH_3O]_{p23}Si(CH_3)_2H$,
$H(CH_3)_2SiO[(Si(OCH_3)_3CH_2C_6H_4CH_2CH_2)Si(CH_3)O][HSiCH_3O]_{p24}Si(CH_3)_2H$,
$H(CH_3)_2SiO[(Si(OCH_3)_3C_6H_4CH_2CH_2)Si(CH_3)O][HSiCH_3O]_{p25}Si(CH_3)_2H$,
$H(CH_3)_2SiO[(Si(OCH_3)_3CH_2CH_2CH_2)Si(CH_3)O][HSiCH_3O]_{p26}Si(CH_3)_2H$,
$H(CH_3)_2SiO[(Si(OCH_3)_3CH_2CH_2CH_2CH_2)Si(CH_3)O][HSiCH_3O]_{p27}Si(CH_3)_2H$,
$H(CH_3)_2SiO[(Si(OCH_3)_3CH_2CH_2CH_2CH_2CH_2CH_2)Si(CH_3)O][HSiCH_3O]_{p28}Si(CH_3)_2H$,
$H(CH_3)_2SiO[(Si(OCH_3)_3CH_2CH_2CH_2CH_2CH_2CH_2CH_2)Si(CH_3)O][HSiCH_3O]_{p29}Si(CH_3)_2H$,
$H(CH_3)_2SiO[(Si(OCH_3)_3CH_2CH_2CH_2CH_2CH_2CH_2CH_2CH_2CH_2)Si(CH_3)O][HSiCH_3O]_{p30}Si(CH_3)_2H$,
$H(CH_3)_2SiO[(Si(OCH_3)_3CH_2CH_2C_6H_4CH_2CH_2)Si(CH_3)O][HSiCH_3O]_{p31}Si(CH_3)_2H$,
$H(CH_3)_2SiO[(Si(OCH_3)_3CH_2C_6H_4CH_2CH_2CH_2)Si(CH_3)O][HSiCH_3O]_{p32}Si(CH_3)_2H$,
$H(CH_3)_2SiO[(Si(OCH_3)_3CH_2C_6H_4CH_2CH_2)Si(CH_3)O][HSiCH_3O]_{p33}Si(CH_3)_2H$,
$H(CH_3)_2SiO[(Si(OCH_3)_3C_6H_4CH_2CH_2)Si(CH_3)O][HSiCH_3O]_{p34}Si(CH_3)_2H$,
$H(CH_3)_2SiO[(Si(OCH_3)_3CH_2CH_2C_6H_4CH_2CH_2)Si(CH_3)O][HSiCH_3O]_{p35}Si(CH_3)_2H$,
$H(CH_3)_2SiO[(CH_3O)Si(CH_3)CH_2CH_2CH_2CH_2CH_2CH_2Si(CH_3)_2OSiC_6H_5O]_{p36}[HSi(CH_3)_2OSiC_6H_5O]_{q4}Si(CH_3)_2H$,
$H(CH_3)_2SiO[Si(OCH_3)_2CH_2CH_2CH_2CH_2CH_2CH_2Si(CH_3)_2 OSiC_6H_5O]_{p37}[HSi(CH_3)_2OSiC_6H_5O]_{q5}Si(CH_3)_2H$,
$C_2H_5O(CH_3)_2SiO[SiH(CH_3)O]_{p38}[SiCH_3(C_6H_5)O]_{q6}Si(CH_3)_2H$,
$Si(OC_2H_5)_3CH_2CH_2CH_2CH_2CH_2CH_2(CH_3)_2SiO[SiH(CH_3)O]_{p39}[SiCH_3(C_6H_5)O]_{q7}Si(CH_3)_2H$,
$C_2H_5OSi(CH_3)_2CH_2CH_2CH_2CH_2CH_2CH_2(CH_3)_2SiO[SiH(CH_3)O]_{p40}[SiCH_3(C_6H_5)O]_{q8}Si(CH_3)_2H$,
$H(CH_3)_2SiO(C_2H_5O)Si(CH_3)O[SiH(CH_3)O]_{p41}[SiCH_3(C_6H_5)O]_{q9}Si(CH_3)_2H$, and
$H(CH_3)_2SiO[Si(OC_2H_5)_3CH_2CH_2CH_2Si(CH_3)]O[SiH(CH_3)O]_{p42}[SiCH_3(C_6H_5)O]_{q10}Si(CH_3)_2H$.

In the above-mentioned groups, p1 to p42 and q1 to q10 are a number of 1 to 100. It is preferable that one molecule thereof has 1 to 99 hydrosilyl groups.

The silyl-ether linkage generated on the surface of the substrate (i.e. Sub.) of the base material for adhesion by the vinylsilyl-containing silyl group is represented by the following chemical formula (2).

$$\text{Sub.-O—SiR}^{21} \quad (2)$$

In the chemical formula (2), $R^{21}$ of the vinylsilyl-containing silyl group-$SiR^{21}$ has $—Si—R^3$ group on the terminal thereof in which R³ is a vinyl-containing group, or —Si(R⁴)— group between both terminals thereof in which R⁴ is a vinyl-containing group.

Concretely, —SiR²¹ is represented by the group consisting of
—(C₂H₅O)₂SiCH₂—CH=CH₂,
—(C₂H₅O)₂SiCH₂CH₂—CH=CH₂,
—(C₂H₅O)₂SiCH₂CH₂CH₂CH₂—CH=CH₂,
—(C₂H₅O)₂SiCH₂CH₂CH₂CH₂CH₂CH₂—CH=CH₂,
—C₂H₅OSi(CH=CH₂)OSi(OC₂H₅)—CH=CH₂,
—(CH₃O)₂SiCH₂CH₂C₆H₄—CH=CH₂,
—(CH₃O)Si(CH=CH₂)O[SiOCH₃(CH=CH₂)O]$_{r1}$Si(OCH₃)₂—CH=CH₂,
—(C₂H₅O)Si(CH=CH₂)O[SiOC₂H₅(CH=CH₂)O]$_{r2}$Si(OC₂H₅)₂—CH=CH₂,
—(C₂H₅O)₂SiCH₂CH₂CH₂Si(CH₃)₂OSi(CH₃)₂CH₂CH₂[Si(CH₃)₂O]$_{r3}$—CH=CH₂,
—(CH₃O)₂SiCH₂CH₂CH₂Si(CH₃)₂OSi(CH₃)₂CH₂CH₂[Si(CH₃)₂O]$_{r4}$—CH=CH₂,
—(CH₃)₂SiCH₂CH₂CH₂Si(CH₃)₂OSi(CH₃)₂CH₂CH₂[Si(CH₃)₂O]$_{r5}$—CH=CH₂,
—(C₂H₅O)CH₃SiCH₂CH₂CH₂Si(CH₃)₂OSi(CH₃)₂CH₂CH₂[Si(CH₃)₂O]$_{r6}$—CH=CH₂,
—(—O)SiCH₂CH₂CH₂Si(CH₃)₂OSi(CH₃)₂CH₂CH₂[Si(CH₃)₂O]$_{r7}$—CH=CH₂,
—(C₂H₅O)₂SiCH₂CH₂CH₂Si(CH₃)₂OSi(CH₃)₂CH₂CH₂(Si(CH₃)₃O)Si(CH₃)O[SiCH₃(-)O]$_{s1}$Si(CH₃)₃,
—(C₂H₅O)₂SiCH₂CH₂CH₂Si(CH₃)₂OSi(CH₃)₂CH₂CH₂(Si(CH₃)₃O)Si(CH₃)O[SiCH₃(-)O]$_{s2}$[Si(CH₃)₂O]$_{r8}$Si(CH₃)₃,
—C₂H₅OSi(CH=CH₂)O[SiCH₃(-)O]$_{s3}$Si(OC₂H₅)₂CH=CH₂,
—C₂H₅OSi(CH=CH₂)O[SiCH₃(-)O]$_{s4}$Si(CH=CH₂)OC₂H₅—CH=CH₂,
—(—O)Si(CH=CH₂)O[SiCH₃(-)O]$_{s5}$Si(OC₂H₅)₂CH=CH₂,
—(—O)Si(CH=CH₂)O[SiCH₃(-)O]$_{s6}$Si(CH=CH₂)(O—)—CH=CH₂,
—(—O)Si(CH=CH₂)O[SiCH₃(-)(O—)]$_{s7}$Si(CH=CH₂)(O—)—CH=CH₂,
—Si(CH=CH₂)O[Si(-)OC₂H₅]$_{s8}$[Si(O—)CH=CH₂]₂,
—Si (CH=CH₂)O[Si(O—)]$_{r9}$[Si(-)OC₂H₅]$_{s9}$[Si(OC₂H₅)₂CH=CH₂]₂, and
—Si(CH=CH₂)O[Si(-) (O—)]$_{s10}$[Si(O—)CH=CH₂]₂.

In the above-mentioned groups, r1 to r9 and s1 to s10 are a number of 1 to 30. It is preferable that one group thereof has 1 to 30 vinyl groups (i.e. CH=CH₂ groups).

Examples of the functional alkoxysilyl compound that generates the vinylsilyl-containing silyl group are as follows.
(C₂H₅O)₃SiCH₂CH=CH₂,
(CH₃O)₃SiCH₂CH₂CH=CH₂,
(C₂H₅O)₃SiCH₂CH₂CH=CH₂,
(CH₃O)₃SiCH₂CH₂CH₂CH₂CH=CH₂,
(C₂H₅O)₃SiCH₂CH₂CH₂CH₂CH=CH₂,
(C₂H₅O)₃SiCH₂CH₂CH₂CH₂CH₂CH₂CH=CH₂,
(CH₃O)₃SiCH₂(CH₂)₇CH=CH₂,
(C₂H₅O)₂Si(CH=CH₂)OSi(OC₂H₅)CH=CH₂,
(CH₃O)₃SiCH₂CH₂C₆H₄CH=CH₂,
(CH₃O)₂Si(CH=CH₂)O[SiOCH₃(CH=CH₂)O]$_{r1}$Si(OCH₃)₂CH=CH₂,
(C₂H₅O)₂Si(CH=CH₂)O[SiOC₂H₅(CH=CH₂)O]$_{r2}$Si(OC₂H₅)₃,
(C₂H₅O)₃SiH₂CH₂CH₂CH₂Si(CH₃)₂OSi(CH₃)₂CH₂CH₂[Si(CH₃)₂O]$_{r3}$CH=CH₂,
(CH₃O)₃SiCH₂CH₂CH₂Si(CH₃)₂OSi(CH₃)₂CH₂CH₂[Si(CH₃)₂O]$_{r4}$CH=CH₂,
CH₃O(CH₃)₂SiCH₂CH₂CH₂Si(CH₃)₂OSi(CH₃)₂CH₂CH₂[Si(CH₃)₂O]$_{r5}$CH=CH₂,
(C₂H₅O)CH₃SiCH₂CH₂CH₂Si(CH₃)₂OSi(CH₃)₂CH₂CH₂[Si(CH₃)₂O]$_{r6}$CH=CH,
(C₂H₅O)₃SiCH₂CH₂CH₂Si(CH₃)₂OSi(CH₃)₂CH₂CH₂[Si(CH₃)₂O]$_{r7}$CH=CH,
(C₂H₅O)₃SiCH₂CH₂CH₂Si(CH₃)₂OSi (CH₃)₂CH₂CH₂(Si(CH₃)₃O)Si(CH₃)O[SiCH₃(-)O]$_{u1}$Si(CH₃)₃CH=CH₂,
(C₂H₅O)₃SiCH₂CH₂CH₂Si(CH₃)₂OSi(CH₃)₂CH₂CH₂(Si(CH₃)₃O)Si(CH₃)O[SiCH₃(-)O]$_{u2}$[Si(CH₃)₂O]$_{r8}$Si(CH₃)₃ CH=CH₂,
(C₂H₅O)₂Si(CH=CH₂)O[SiCH₃(OC₂H₅)O]$_{u3}$Si(OC₂H₅)₂CH=CH₂,
(C₂H₅O)₂Si(CH=CH₂)O[Si(OC₂H₅)₂O]$_{u4}$Si(OC₂H₅)₂CH=CH₂, and
(C₂H₅O)₂Si(CH=CH₂)O[Si(OC₂H₅)₂O]$_{u5}$Si(OC₂H₅)₂CH=CH₂.

In the above-mentioned groups, t1 to t8 and u1 to u5 are a number of 1 to 30. It is preferable that one molecule thereof has 1 to 30 vinyl groups.

The silyl-ether-linkage generated on the surface of the substrate (i.e. Sub.) of the base material for adhesion by the terminal-alkoxysilyl-containing silyl group is represented by the following chemical formula (3).

Sub.-O—SiR²²     (3)

In the chemical formula (3), R²² in the terminal-alkoxysilyl-containing silyl group —SiR²² has —Si(OR⁵)₂R⁶ group on the terminal thereof in which R⁵ and R⁶ are an alkyl group having 1 to 4 carbon atoms, or —Si(OR⁷)₃ group on the terminal thereof in which R⁷ is an alkyl group having 1 to 4 carbon atoms. Concretely, —SiR²² is represented from the group consisting of
—(C₂H₅O)₂SiCH₂CH₂Si(OC₂H₅)₃,
—(C₂H₅O)CH₃SiCH₂CH₂Si(OC₂H₅)₃,
—(C₂H₅O)₂SiCH=CHSi(OC₂H₅)₃,
—(CH₃O)₂SiCH₂CH₂Si(OCH₃)₃,
—(CH₃O)₂SiCH₂CH₂C₆H₄CH₂CH₂Si(OCH₃)₃,
—(CH₃O)₂Si[CH₂CH₂]₃Si(OCH₃)₃,
—(CH₃O)₂Si[CH₂CH₂]₄Si(OCH₃)₃,
—(CH₃O)CH₃SiCH₂CH₂Si(OCH₃)₂CH₃,
—(C₂H₅O)CH₃SiOSi(OC₂H₅)₂CH₃, and
—(C₂H₅O)Si(OC₂H₅)₂

Examples of the functional alkoxysilyl compound that generates the terminal-alkoxysilyl-containing silyl group are as follows.
(C₂H₅O)₃SiCH₂CH₂Si(OC₂H₅)₃,
(C₂H₅O)₂CH₃SiCH₂CH₂Si(OC₂H₅)₃,
(C₂H₅O)₃SiCH=CHSi(OC₂H₅)₃,
(CH₃O)₃SiCH₂CH₂Si(OCH₃)₃(CH₃O)₃SiCH₂CH₂C₆H₄CH₂CH₂Si(OCH₃)₃,
(CH₃O)₃Si[CH₂CH₂]₃Si(OCH₃)₃,
(CH₃O)₂Si[CH₂CH₂]₄Si(OCH₃)₃,
(C₂H₅O)₂Si(OC₂H₅)₂,
(CH₃O)₂CH₃SiCH₂CH₂Si(OCH₃)₂CH₃,
(C₂H₅O)₂CH₃SiOSi(OC₂H₅)₂CH₃,
(CH₃O)₃SiO[Si(OCH₃)₂O]$_{v1}$Si(OCH₃)₃,
(C₂H₅O)₃SiO[Si(OC₂H₅)₂O]$_{v2}$Si(OC₂H₅)₃, and
(C₃H₇O)₃SiO[Si(OC₃H₇)₂O]$_{v3}$Si(OC₃H₇)₃.

In the above-mentioned groups, v1 to v3 are a number of 0 to 30.

The silyl-ether-linkage generated on the surface of the substrate (i.e. Sub.) of the base material for adhesion by the hydrolytic group-containing silyl group is represented by the following chemical formula (4).

Sub.-O—Si(R⁸)$_a$(R⁹)$_{3-a}$     (4)

In the chemical formula (4), $R^8$ is selected from the group consisting of hydrogen atom; a halogen atom; an alkyl group, an alkenyl group, an alkyloxy group and a fluoro-substituted alkyl group that respectively have 1 to 12 carbon atoms; an aralkyl group; and aryl group. $R^9$ is selected from the group consisting of an acyloxy group, an alkenyloxy group, an alkaniminooxy group, an alkyloxy group, an alkylamino group and a dialkylamino group that respectively have 1 to 12 carbon atoms; a nitrogenous heterocyclic group and an arylamino group. a is a number of 0 to 3. Concretely, $R^8$ in the hydrolytic group-containing silyl group: $—Si(R^8)_a(R^9)_{3-a}$ is represented by H—, F—, $CH_3$—, $C_2H_5$—, $CH_2$=CH—, n-$C_3H_7$—, i-$C_3H_7$—, $CH_2$=CHCH$_2$—, $C_4H_9$—, $C_6H_{13}$—, $C_8H_{17}$—, $C_6H_5$—, $CH_3C_6H_4$—, $C_6H_5CH_2$—, $CF_3CF_2CH_2CH_2$—, $CF_3CF_2CF_2CH_2CH_2$—, $CF_3CF_2CF_2CF_2CF_2CF_2CH_2CH_2$—, $CH_3O$— or $C_2H_5O$—. $R^9$ therein is represented by $CH_3COO$—, $CH_2$=C($CH_3$)O—, $C_2H_5(CH_3)C$=NO—, $CH_3O$—, $(CH_3)_2N$—, $(C_2H_5)_2N$—, (i-$C_3H_7)_2N$—, O.($CH_2CH_2)_2N$—, $(CH_3)_3CNH$—, $C_6H_{10}NH$— or $C_6H_5NH$—.

Examples of the functional alkoxysilyl compound that generates the hydrolytic group-containing silyl group is a hydrolysable organosilane such as $CH_3Si(OCOCH_3)_3$, $(CH_3)_2Si(OCOCH_3)_2$, n-$C_3H_7Si(OCOCH_3)_3$, $CH_2$=CHCH$_2Si(OCOCH_3)_3$, $C_6H_5Si(OCOCH_3)_3$, $CF_3CF_2CH_2CH_2Si(OCOCH_3)_3$, $CH_2$=CHCH$_2Si(OCOCH_3)_3$, $CH_3OSi(OCOCH_3)_3$, $C_2H_5OSi(OCOCH_3)_3$, $CH_3Si(OCOC_3H_7)_3$, $CH_3Si[OC(CH_3)$=$CH_2]_3$, $(CH_3)_2Si[OC(CH_3)$=$CH_2]_3$, n-$C_3H_7Si[OC(CH_3)$=$CH_2]_3$, $CH_2$=CHCH$_2Si[OC(CH_3)$=$CH_2]_3$, $C_6H_5Si[OC(CH_3)$=$CH_2]_3$, $CF_3CF_2CH_2CH_2Si[OC(CH_3)$=$CH_2]_3$, $CH_2$=CHCH$_2Si[OC(CH_3)$=$CH_2]_3$, $CH_3OSi[OC(CH_3)$=$CH_2]_3$, $C_2H_5OSi[OC(CH_3)$=$CH_2]_3$, $CH_3Si[ON$=$C(CH_3)C_2H_5]_3$, $(CH_3)_2Si[ON$=$C(CH_3)C_2H_5]_2$, n-$C_3H_7Si[ON$=$C(CH_3)C_2H_5]_3$, $CH_2$=CHCH$_2Si[ON$=$C(CH_3)C_2H_5]_3$, $C_6H_5Si[ON$=$C(CH_3)C_2H_5]_3$, $CF_3CF_2CH_2CH_2Si[ON$=$C(CH_3)C_2H_5]_3$, $CH_2$=CHCH$_2Si[ON$=$C(CH_3)C_2H_5]_3$, $CH_3OSi[ON$=$C(CH_3)C_2H_5]_3$, $C_2H_5OSi[ON$=$C(CH_3)C_2H_5]]_3$, $CH_3Si[ON$=$C(CH_3)C_2H_5]_3$, $CH_3Si[N(CH_3)]_3$, $(CH_3)_2Si[N(CH_3)]_2$, n-$C_3H_7Si[N(CH_3)]_3$, $CH_2$=CHCH$_2Si[N(CH_3)]_3$, $C_6H_5Si[N(CH_3)]_3$, $CF_3CF_2CH_2CH_2Si[N(CH_3)]_3$, $CH_2$=CHCH$_2Si[N(CH_3)]_3$, $CH_3OSi[N(CH_3)]_3$, $C_2H_5OSi[N(CH_3)]_3$ and $CH_3Si[N(CH_3)]_3$.

The functional alkoxysilyl compound is used by being dissolved in water; alcohols such as methanol, ethanol, isopropanol, ethylene glycol; ketones such as acetone and methyl ethyl ketone; esters such as ethyl acetate; halide such as methylene chloride; hydrocarbons such as butane and hexane; ethers such as tetrahydrofuran and butyl ether; aromatics such as benzene and toluene; amides such as dimethylformamide and methylpyrrolidone; and a mixed solvent thereof.

It is preferable that an additive amount of the functional alkoxysilyl compound is approximately 0.001 g to 5 g per 100 g of the before-mentioned solvent. If the additive amount thereof is less than 0.001 g, the adhesion is insufficient. Also, it is not preferable if the additive amount is more than 5 g because it results in generating a multilayered thin layer even if the condition is controlled.

While examples of the substrate of the base material for adhesion made from metal was explained above, a substrate made from polymer resin, glass or ceramics can be used as well.

The hydroxyl group can be general hydroxyl group derived from metal oxide on the surface of the metal, a polymer having hydroxyl group, or hydroxyl group of ceramics.

Examples of the metal are a metallic material such as Mg, Ti, Be, Ca, Li, Al, Mn, Zn, Cr, Ga, Fe, Cd, In, Ta, Co, Ni, Sn, Sb, Bi, Pb, Cu, Ag, Pt, Pd and Au; a binary alloy, a ternary alloy and a multi alloy of these metallic material. Examples of the alloy are Mg-alloy, Al-alloy, Fe—Cr—Ni-alloy, Ni-alloy, Co-alloy, Cu—Zn-alloy, Cu—Sn-alloy, Cu—Ni-alloy and Ag-alloy. Each of the substrate made from the metal or the alloy generates an oxide layer on the surface thereof for introducing the hydroxyl group thereto.

Examples of the polymer resin are a polymer material of a cellulose derivative (ex. cellulose, hydroxyethyl cellulose, starch and cellulose diacetate), vinyl acetate resin saponify partially on the surface thereof, low-density polyethylene, high-density polyethylene, i-polypropylene, petroleum resin, polystyrene, s-polystyrene, chromane-indene resin, terpene resin, styrene-divinylbenzene compolymer, acrylonitrile-butadiene-styrene resin (ABS resin), polymethyl acrylate, polyethyl acrylate, polyacrylonitrile, polymethyl methacrylate, polyethyl methacrylate, polycyanoacrylate, polyvinyl acetate, polyvinyl alcohol, polyvinyl formal, polyvinyl acetal, polyvinyl chloride, vinyl chloride-vinyl acetate copolymer, vinyl chloride-ethylene copolymer, polyvinylidene-fluoride, vinylidene fluoride-ethylene copolymer, vinylidene fluoride-propylene copolymer, 1,4-trans-polybutadiene, polyoxymethylene, polyethyleneglycol, polypropylene glycol, phenol-formaline resin, cresol-formaline resin, resorcin resin, melamine resin, xylene resin, toluene resin, glyptal resin, modified glyptal resin, polyethylene terephthalate, polybutylene terephthalate, unsaturated polyester resin, allyl ester resin, polycarbonate, 6-nylon, 6'6-Nylon, 6'10-nylon (nylon is a registered trademark), polyimide, polyamide, polybenzimidazole, polyamideimide, silicon-containing resin (ex. silicone rubber, silicone resin), fran resin, polyurethane resin, epoxide resin, polyphenylene oxide, polydimethylphenylene oxide, polyxylene, polyphenylene sulfide (PPS), polysulfone (PSF), polyether sulfone (PES), polyether ether ketone (PEEK), polyimide (PPI, ex. kapton), liquid crystal resin, Kevlar fiber, mixture of carbon fiber and pulural thereof, polytetrafluoroethylene (PTFE) and so on; a rubber material such as natural rubber, 1,4-cis-butadiene rubber, isoprene rubber, polychloroprene rubber, styrene-butadiene copolymer rubber, hydrogenated styrene-butadiene copolymer rubber, acrylonitrile-butadiene copolymer rubber, hydrogenated acrylonitrile-butadiene copolymer rubber, polybutene, polyisobutylene, ethylene-propylene rubber, ethylene-propylene terpolymer, chlorinated polyethylene, chlorsulfonated polyethylene, alkylated chlorsulfonated polyethylene, chloroprene rubber, chlorinated acrylic rubber, brominated acrylic rubber, fluoro-rubber, epichlorohydrin and the copolymer rubber, chlorinated ethylene-propylene rubber, chlorinated butyl rubber, brominated butyl rubber and so on. The plural polymer resin may be mixed or crosslinked.

Examples of ceramics are a sintered body of metallic material such as Mg, Ti, Be, Ca, Li, Al, Mn, Zn, Cr, Ga, Fe, Cd, In, Ta, Co, Ni, Sn, Sb, Bi, Pb, Cu and Ag, a sintered body of oxide of binary metal alloy thereof, a sintered body of oxide of ternary metal alloy, and a sintered body of oxide of multi metal alloy.

The substrate of the base material for adhesion is not intended to be limited unless it is made from the metal, the polymer resin, the glass or the ceramics, and it can be a particle. The substrate can be a film, a plate or a fabric in a shape of rectangle, square, polygon and so on, while it also can be in a product of a tube, macaroni yarn, a hose or a net. The substrate can be in a shape of sphere or oval sphere.

The example of introducing the hydroxyl group to the surface of the substrate by the corona discharge treatment was explained above. Also, the hydroxyl group can be introduced thereto by atmospheric-pressure plasma treatment or ultraviolet irradiation treatment.

Corona discharge treatment was proceeded according to the instruction indicated in Corona Discharge Treatment by The Adhesion Society of Japan, Vol. 36, No. 3, p. 126 (2000). Atmospheric-pressure plasma treatment was proceeded according to the instruction indicated in Plasma Treatment by The Adhesion society of Japan, Vol. 41, No. 1, p. 4 (2005). Ultraviolet irradiation treatment was proceeded by an exposure of ultraviolet ray. As it is mentioned in L. J. Gerenser: J. Adhesion Sci. Technol. Vol. 7, p. 1019 (1997), by these procedures, hydroxyl group, calboxyl group, or calbonyl group is generated or appeared on the surface of the substrate made from metal, polymer resin, glass or ceramics.

Not every polymer resin originally has hydroxyl group. Even if the surface of the substrate made from the polymer resin does not have hydroxyl group thereon, hydroxyl group is efficiently generated on the surface thereof by corona discharge treatment, atmospheric-pressure plasma treatment or ultraviolet irradiation treatment.

Although the preferable treatment condition differs depending on the material of a type or course on the surface of the substrate, it is important that the treatment is treated continually until the surface tension thereof goes up to 55 kJ/m or more in order to achieve sufficient adhesive strength.

Concretely, the corona discharge treatment on the surface of the substrate made from the resin or the resin composition is proceeded by a surface reforming instrument such as Corona Master that is available from Shinko electric & Instrumentation Co., Ltd. The treatment is proceeded at 0 to 60 degrees centigrade for 0.1 to 60 seconds under the condition of output power: AC 100V, output voltage: 0 to 20 kV and oscillation frequency: 0 to 40 kHz The atmospheric-pressure plasma treatment on the surface of the substrate made from the resin or the resin composition is proceeded by an atmospheric-pressure plasma generator such as Aiplasuma that is available from Matsushita Electric Works, Ltd. The treatment is proceeded under the condition of plasma processing rate: 10 to 100 mm/s, output power: 200 or 220V AC (30 A), compression air: 0.5 MPa (1 NL/min) and 10 kHz/300 W-5 GHz, electrical power: 100 W to 400 W and irradiating time: 0.1 to 60 seconds.

The ultraviolet irradiation treatment of the surface of the substrate made from the resin or the resin composition is proceeded by ultraviolet ray light emitting diodes (UV-LED) irradiating instrument such as ZUV-C30H that is available from Omron Corporation. The treatment is proceeded under the condition of wavelength: 200 to 400 nm, output power: 100V AC, peak illumination intensity of the light source: 400 to 300 mW/cm² and irradiating time: 1 to 60 seconds.

The surface of the base material for adhesion on which the hydroxyl group is generated by a pretreatment such as the corona discharge treatment can be in contact with the functional alkoxysilyl compound of a molecular adhesive agent by soaking the surface thereof or spraying the compound thereto. The time of soaking thereof or spraying the compound thereto is not limited, and it is important that the surface of the base material for adhesion is uniformly wet.

The base material for adhesion of which the functional alkocysilyl compound is applied to the surface is dried by heating thereof in an oven, with a dryer or by irradiating high frequency. The procedure of heating and drying the base material is proceeded in temperature range of 50 degrees centigrade to 250 degrees centigrade for 1 to 60 minutes. If the temperature is lower than 50 degrees centigrade, the reaction time of the hydroxyl group generated on the surface of the base material for adhesion and the functional alkoxysilyl compound takes too long, and as a result it results in decreasing productivity and increasing in cost. If the temperature is higher than 250 degrees centigrade, the surface thereof is deformed or the functional alkoxyl compound is decomposed, even if the time of heating and drying is short. If the procedural time is less than 1 minute, the heat conduction is not enough and therefore the binding of the hydroxyl group on the surface thereof and the functional alkoxysilyl compound is insufficient. If the procedural time is more than 60 minutes, the productivity decreases.

If the reaction of the hydroxyl group on the surface of the base material for adhesion and the functional alkoxysilyl compound is insufficient, the above-mentioned procedures of immersing and drying the surface thereof can be repeated for 1 to 5 times because repeating procedures shortens the time of immersing and drying the surface thereof per procedure and therefore accelerates the reaction.

Moreover, by mixing the functional alkoxysilyl compound and the silane compound, a silyl ether having the crosslinking reactivity to silicone rubber crosslinkage can be generated on the surface of the base material for adhesion.

For example, the silane compound used for the following procedure is selected from the group consisting of;

$HSi(CH_3)_2C_6H_4Si(CH_3)_2H$,
$HSi(CH_3)_2C_6H_4OC_6H_4Si(CH_3)_2H$,
$CH_3Si(H)_2C_2H_4Si(H)_2CH_3$,
$HSi(CH_3)_2C_2H_4Si(CH_3)_2H$,
$HSi(CH_3)_2OSi(CH_3)_2H$,
$HSi(CH_3)_2O[Si(CH_3)_2O]_{x1}Si(CH_3)_2H$ (x1=1-840),
$(CH_3)_3SiO[SiH(R^{17})O]_{x2}[Si(CH_3)_2O]_{y1}Si(CH_3)_3$
  ($R^{17}$=$CH_3$—, $C_2H_5$—, $C_6H_5$—; y1=1-50; x2=0-50),
$HSi(CH_3)_2O[SiC_6H_5(OSi(CH_3)_2H)]_{x3}Si(CH_3)_2H$ (x3=1-5) and
$HSi(CH_3)_2O[SiCH_3(H)O]_{x4}[SiCH_3(C_6H_5)O]_{y2}Si(CH_3)_2H$ (x4=1-10, y2=1-10).

After reacting the hydroxyl group on the surface of the substrate with the functional alkoxysilyl compound, the substrate is immersed into alcohol solution of 0.01% to 5% of the silane compound. Then it is heated at 0 to 200 degrees centigrade for 1 to 60 minutes to obtain a silicone rubber-adhesive base material. If the concentration of the silane compound in the alcohol solution is less than 0.01%, the reacting time takes too long. If the concentration thereof is more than 5%, the cost for cleaning and collecting unreacted silane compound increases. If the reaction time is less than 1 minute, the reaction may be completed, and if it is more than 60 minutes, the productivity decreases.

Similarly, the silicone rubber-adhesive base material also can be obtained by the following procedures. Unsaturated alkoxysilane compound used for the following procedure is for example selected from the group consisting of;

$CH_2$=$CHCH_2Si(OC_2H_5)_3$,
$CH_2$=$CHCH_2CH_2Si(OC_2H_5)_3$,
$CH_2$=$CHCH_2CH_2CH_2CH_2Si(OC_2H_5)_3$,
$CH_2$=$CHCH_2CH_2CH_2CH_2CH_2CH_2Si(OCH_3)_3$,
$CH_2$=$CHSi(OC_2H_5)_2OSi(OC_2H_5)_2CH$=$CH_2$,
$CH_2$=$CHC_6H_4CH_2CH_2Si(OCH_3)_3$,
$CH_2$=$CHSi(OCH_3)_2O[SiOCH_3(CH$=$CH_2)O]_{x5}Si(OCH_3)_2$
  $CH$=$CH_2$ in which x5 is 1 to 30,
$CH_2$=$CHSi(CH_3)_2O[Si(CH_3)_2O]_{y3}[Si(R^{18})_2O]_{x6}Si(CH_3)_2$
  $CH$=$CH_2$ in which $R^{18}$ is $CH_3$—, $C_2H_5$—, $C_6H_5$— or $CF_3CH_2CH_3$—, x6 is 0 to 2100 and y3 is 0 to 2100,
$(CH_3)_3SiO[Si(CH_3)_2O]_{y4}[SiCH_3(CH$=$CH_2)O]_{x7}Si(CH_3)_3$
  in which x7 is 0 to 2100 and y4 is 0 to 2100, and $(CH_3)_3SiO[Si(CH_3)_2O]_{y5}[SiCH_3(CH=CH_2)O]_{x8}[SiCH_3(R^{19})O]_{z1}Si(CH_3)_3$ in which $R^{19}$ is $CH_3-$, $C_2H_5-$, $C_6H_5-$ or $CF_3CH_2CH_3-$, x8 is 0 to 2100, y5 is 0 to 2100 and z1 is 0 to 2100.

After the hydroxyl group on the surface of the substrate with the unsaturated alkoxysilane compound, the substrate is immersed into suspension of the mixture of 0.01% to 5% of the silane compound and 10 to 1000 ppm of platinum catalyst. It is heated at 0 to 200 degrees centigrade for 1 to 60 minutes to obtain a silicone rubber-adhesive base material.

If the concentration of the silane compound is less than 0.01%, the reacting time takes too long. If the concentration thereof is more than 5%, the cost for cleaning and collecting unreacted silane compound increases. If the concentration of the platinum catalyst is less than 10 ppm, the reacting speed is too slow. If the concentration thereof is more than 1000 ppm, the cost increases. If the temperature is lower than 0 degrees centigrade, the reactivity is low and therefore the productivity is low. If the temperature is higher than 200 degrees centigrade, SiH group is oxidized and therefore the quality of the silicone rubber-adhesive base material is poor. If the reaction time is less than 1 minute, the reaction may be completed, and if it is more than 60 minutes, the productivity decreases.

A silicone rubber-adhesive base material also can be obtained by the following procedures. After the hydroxyl group on the surface of the substrate is reacted with the functional polyalkoxysilane, the substrate is immersed into methanol solution of 0.01 to 5% of terminal-silanol siloxan such as $HOSi(CH_3)_2O[Si(CH_3)_2O]_2Si(CH_3)_2OH$. It is heated at 0 to 200 degrees centigrade for 1 to 60 minutes to obtain a silicone rubber-adhesive base material having the silanol group on the surface thereof.

If the concentration of terminal-silanol siloxane is less than 0.01%, the reaction time takes too long. If the concentration thereof is more than 5%, the cost for cleaning and collecting unreacted terminal-silanol siloxane increases. If the reaction temperature is lower than 0 degrees centigrade, the reactivity and productivity are low. If the temperature is higher than 200 degrees centigrade, a multilayered silicone rubber-adhesive base material can be obtained. If the reaction time is less than 1 minute, the reaction may not be completed, and if it is more than 60 minutes, the productivity decreases.

The silicone rubber-adhesive base material, which is obtained by the procedure of introducing the crosslinkage reactive group such as the hydrosilyl (SiH) group, the unsaturated group and the silanol (SiOH) group to the surface thereof, and a composition including a silicone rubber component are contacted, and by keeping thereof or heating thereof, they are adhered through crosslinkage. This is further explained hereunder.

After contacting the silicone rubber-adhesive base material and the composition including silicone rubber component, they are heated at 0 to 200 degrees centigrade for 1 to 240 minutes under the atmospheric pressure to the pressure of 100 kg/cm² to obtain a silicone rubber-adhered article.

If the temperature is lower than 0 degrees centigrade, the crosslinkage reaction rate is too slow and the productivity is low. If the temperature is higher than 200 degrees centigrade, heating spoils thermal stability of the used polymer resin is not preferable. If the reaction time is less than 1 minute, the crosslinkage reaction is insufficient, and most of the time the silicone rubber-adhesive base material and the composition are not adhered. If the reaction time is more than 240 minutes, the productivity is low. Except for manufacturing a foam blanket the strength of silicone rubber under the atmospheric pressure is low. Also, there is no any significant advantage of controlling the pressure in the procedure more than 100 kg/cm².

Examples of the silicone rubber component are;
poly-H-siloxane selected from the group represented by the following chemical formula (5)

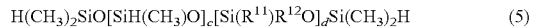

$H(CH_3)_2SiO[SiH(CH_3)O]_c[Si(R^{11})R^{12}O]_dSi(CH_3)_2H$ (5)

(in the chemical formula (5), $R^{11}$ and $R^{12}$ are more concretely represented by the group consisting of $CH_3-$, $C_2H_5-$, $CH_2CH=CH_2-$, $n-C_3H_7-$, $i-C_3H_7-$, $n-C_6H_{13}-$, $n-C_8H_{17}-$, $C_6H_5-$, $C_6H_5CH_2-$, $C_6H_5CH_2CH_2-$, $C_{10}H_7-$, $CF_3CH_2CH_2-$, $CF_3CF_2CH_2CH_2-$, $CF_3CF_2CF_2CH_2CH_2-$, $CF_3CF_2CF_2CF_2CF_2CH_2CH_2-$, $CF_3CF_2CF_2CF_2CF_2CF_2CH_2CH_2-$, $CF_3CF_2CF_2CF_2CF_2CF_2CF_2CF_2CH_2CH_2-$, $CF_3CF_2CF_2CF_2CF_2CF_2CF_2CF_2CF_2CF_2CH_2CH_2-$, and $HSi(CH_3)_2O-$. c is a number of 1 to 80 and d is a number of 0 to 80), vinyl silicone selected from the group represented by the following chemical formula (6)

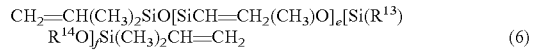

$CH_2=CH(CH_3)_2SiO[SiCH=CH_2(CH_3)O]_e[Si(R^{13})R^{14}O]_fSi(CH_3)_2CH=CH_2$ (6)

(in the chemical formula (6), $R^{13}$ and $R^{14}$ are more concretely represented by the group consisting of $CH_3-$, $C_2H_5$, $CH_2=CH-$, $CH_2=CHCH_2-$, $n-C_3H_7-$, $i-C_3H_7-$, $n-C_6H_{13}-$, $n-C_8H_{17}-$, $C_6H_5-$, $CH_2=CHC_6H_4-$, $CH_2=CHC_6H_4CH_2-$, $C_6H_5CH_2CH_2-$, $C_{10}H_7-$, $CF_3CH_2CH_2-$, $CF_3CF_2CH_2CH_2-$, $CF_3CF_2CF_2CH_2CH_2-$, $CF_3CF_2CF_2CF_2CH_2CH_2-$, $CF_3CF_2CF_2CF_2CF_2CF_2CH_2CH_2-$, $CF_3CF_2CF_2CF_2CF_2CF_2CF_2CF_2CH_2CH_2-$, $CF_3CF_2CF_2CF_2CF_2CF_2CF_2CF_2CF_2CF_2CH_2CH_2-$, and $HSi(CH_3)_2O-$. e is a number of 1 to 80 and f is a number of 0 to 80.) or silanol silicone derivative selected from the group represented by the following chemical formula (7)

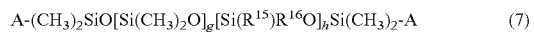

$A-(CH_3)_2SiO[Si(CH_3)_2O]_g[Si(R^{15})R^{16}O]_hSi(CH_3)_2-A$ (7)

(in the chemical formula, $R^{15}$ and $R^{16}$ are more concretely represented by the group consisting of $CH_3-$, $C_2H_5-$, $CH_2=CH-$, $CH_2=CHCH_2-$, $n-C_3H_7-$, $i-C_3H_7-$, $n-C_6H_{13}-$, $n-C_8H_{17}-$, $C_6H_5-$, $CH_2=CHC_6H_4-$, $CH_2=CHC_6H_4CH_2-$, $C_6H_5CH_2CH_2-$, $C_{10}H_7-$, $CF_3CH_2CH_2-$, $CF_3CF_2CH_2CH_2-$, $CF_3CF_2CF_2CH_2CH_2-$, $CF_3CF_2CF_2CF_2CH_2CH_2-$, $CF_3CF_2CF_2CF_2CF_2CF_2CH_2CH_2-$, $CF_3CF_2CF_2CF_2CF_2CF_2CF_2CF_2CH_2CH_2-$, and $CF_3CF_2CF_2CF_2CF_2CF_2CF_2CF_2CF_2CF_2CH_2CH_2-$. A is represented by the group consisting of $HO-$, $CH_3O-$, $C_2H_5O-$, $n-C_3H_{7O}-$, $i-C_3H_7O-$, $C_6H_5O-$, $CH_3COO-$, $CH_2=C(CH_3)O-$, $C_2H_5(CH_3)C=NO-$, and $(CH_3)_2N-$ and $(C_2H_5)_2N-$. g is a number of 1 to 80, h is a number of 0 to 80.)

The composition including silicone rubber component includes at least one silicone rubber component selected from the above groups. The silicone rubber component can be an addition reaction type silicone rubber component of mixture of the group of the chemical formula (5) and the group of chemical formula (6), a peroxide silicone rubber component of the group of chemical formula (6), and a condensation-type silicone rubber component of the group of chemical formula (7) or a mixture of the group of the chemical formula (5) and the group of chemical formula (7).

Besides the above-mentioned silicone rubber component, a filler, a crosslinkage agent and catalyst can be added to the composition including silicone rubber component.

Examples of the filler are wet silica, dry silica, talc, nipsil, carbon black, metallic oxide, and they are added in the range of 10 to 100 parts by weight. If the additive amount is less than 10 parts by weight, the stiffening effect is insufficient, and if the amount thereof is more than 100 parts by weight, it is difficult to blend for filling the filler up.

Silicone rubber is prepared through crosslinking such as crosslinking type peroxide, additional reaction type crosslinking, and condensed type crosslinking. The crosslinking of a silicone rubber-adhesive base material and silicone rubber of the silicone rubber blanket can be obtained.

For peroxide type silicone rubber composition, 0.5 to 5 parts by weight of peroxide such as benzoyl peroxide, t-butylperbenzoate, dicumyl peroxide, di-t-butylperoxide, 2,5-dimethyl-2,5-di(t-butylperoxy)hexane, 2,5-dimethyl-2,5-di(t-butylperoxy)hexyne-3 and di(t-dutylperoxyisopropyl)benzene is added into the composition. If the additive amount of peroxide is less than 0.5 parts by weight, the crosslinkage is insufficient, and if the amount thereof is more than 5 parts by weight, the crosslinkage may happen during forming on ahead preparation.

An adhesive article, which is prepared by cross-linking the surface of the silicone rubber-adhesive base material and peroxide type silicone rubber component of the composition, can be obtained by heating thereof at 80 to 200 degrees centigrade for 1 to 60 minutes. If the temperature is lower than 80 degrees centigrade, it is difficult to obtain an adhesive article, and if the temperature is higher than 200 degrees centigrade, the silicone rubber may turn yellowish color. If heating time is less than 1 minute, the crosslinkage is insufficient, and if it is more than 60 minutes, the productivity is low and the cost is high.

For the additional reaction type silicone rubber composition, as catalyst used for the additional reaction type crosslinkage, chloroplatinic acid, platinum carbonyl cyclovinylmethylsiloxane complex, platinum divinyl tetramethyldisiloxane complex, platinum cyclovinylmethylsiloxane complex, platinum octanal/octanol complex or tris(dibutylsulfide)rhodiumtrichloride is added into the composition within the range of 1 to 100 ppm. If the concentration thereof is less than 1 ppm, the crosslinkage is insufficient, and if the concentration thereof is more than 100 ppm, the cost increases.

The above-mentioned catalyst is used by being added to the composition including silicone rubber component of the silicone rubber represented by the chemical formula (5), the silicone rubber represented by the chemical formula (6) or the mixture of these silicone rubbers.

In case of using an ordinary industrial product of rubber molded article having thickness of less than 10 mm, the composition including silicone rubber component can be cross-linked to the substrate by hearing thereof at 0 to 150 degrees centigrade for 1 to 240 minutes. If the temperature is lower than 0 degrees centigrade, it is difficult to obtain an adhesive article. Incidentally, there is no sufficient problem if the temperature is over 150 degrees centigrade. If the heating time is less than 1 minute, the crosslinkage is insufficient. If the heating time is more than 240 minutes, the productivity is low and the cost increases. If the thickness of rubber molded article is more than 10 mm, the heat conductivity and cross-linking speed inside the article decreases. Therefore, it may be necessary to keep the temperature of a mold in order to proceed a crosslinkage for a longer time. In this case, the temperature can be changed accordingly. In case of using a relatively thin industrial product of rubber molded article, the composition including silicone rubber component can be cross-linked the substrate by hearing thereof at room temperature for around the clock. In this case, the rubber molded article with high dimensional accuracy can be obtained because differential thermal expansion between high temperature for crosslinking and room temperature for usage thereof is not broken out.

The mixing ratio of the silicone rubber of chemical formula (5) and the silicone rubber of chemical formula (6) is approximately equivalent molar ratio of SiH group and $CH=CH_2$, however, generally the mixing ration thereof is 1.3/1 to 4.5/1. If the mixing ratio is less than 1.3/1, the degree of hardness is lower than the desired hardness. If the mixing ratio is more than 4.5/1, the degree of hardness tend to be lower than the desired hardness. The preferable mixing ratio of SiH group and $CH=CH_2$ is selected accordingly because the mixing ratio is influenced by an additive such as filler.

Especially, if the concentration of SiH group of the crosslinking reactive group on the surface of the substrate is high, adhesive strength increases, even if the mixing ratio of SiH group and $CH=CH_2$ is high. If the concentration of SiH group is low, adhesive strength decreases, even if the mixing ratio of SiH group and $CH=CH_2$ group is high. However, if the concentration of $CH=CH_2$ of the crosslinking reactive group on the surface thereof is high, adhesive strength does not increase unless the mixing ration of SiH group and $CH=CH_2$ is high.

For condensation-type silicone rubber composition, 0.5 to 10 parts by weight of $CH_3Si(OCOCH_3)_3$, $C_2H_5OSi(OCOCH_3)_3$, $CH_3Si[OC(CH_3)=CH_2]_3$, $CH_3Si[ON=C(CH_3)C_2H_5]]_3$, $CH_3OSi[ON=C(CH_3)C_2H_5]]_3$, $CH_3Si[N(CH_3)]_3$ and so on are added into the composition as a condensation-type crosslinking agent. As catalyst, 0.5 to 10 parts by weight of an organic tin compound such as bis(ethylhexyl)tin, bis(neodecanoate)tin, dibutyllauryl tin; a metal salt such aszinc octylate and iron octylate, titanate ester, titanium chelate compounds; amins and so on are added thereto.

Among the condensation-type silicone rubber composition, the condensation-type crosslinking agent is added to the silanol silicone type rubber represented by the chemical formula (7). The catalyst is used by being added to either H silicone polymer represented by the chemical formula (5) or the silanol silicone type rubber represented by the chemical formula (7), or a mixture thereof.

Organic titanium compound can be used together therewith. It is preferable that the organic titanium compound as useful catalyst for hydrolysis and condensation of alkoxysilyl group is organic titanium compound having Ti—O—C bond such as alkoxy titan, titan chelate, titan acylate, composite titanate. Examples of the organic compound are titanium tetraisopropoxide (ORGATIX TA-10), titanium diisopropoxy bis(acetylacetonate) (ORGATIX TC-100), wherein ORGATIX series are available from Matsumoto Trading Co., Ltd. Other examples of the organic compound are PLENACT series of KR TTS, KR 46B, KR 55, KR 41B, KR 38S, KR 138S, KR 238S, 338X, KR 44, KR 9SA and KR ET, wherein PLENACT series are available from Ajinomoto Fine-Techno Co., Inc.

A base material for adhesion and a silicone rubber-adhered article prepared by using thereof can be another embodiment as explained below.

For example, as a substrate, the surface of a washed substrate made from metal such as aluminum is treated by corona discharge treatment in order to generate hydroxyl group thereon. The substrate is immersed into a solution of vinyl-containing silyl compound such as $(CH_2=CH-)(CH_3O-)_2Si-O-[(CH_2=CH-)(CH_3O-)Si-O]_{b1}-Si(-OCH_3)_2(-CH=CH_2)$ and then heated, and the vinyl-containing silyl compound reacts with the hydroxyl group on the surface thereof. Then, the substrate is immersed into hexane solution of platinum catalyst suspension for example platinum catalyst such as platinum-tetramethyldivinyldisiloxane complex and dried in order to obtain a base material for adhesion on which the platinum-containing catalyst is applied. Although the chemical structure thereof is still inapparent, it is assumed that platinum atom of the platinum complex coordinates with several vinyl-containing silyl groups generated on the surface of the base material for adhesion.

The hydrosilyl-containing polysiloxane, or vinyl-containing polysiloxane, or if necessary a composition including platinum catalyst suspension is applied onto the base material for adhesion to harden thereof in order to obtain an adhesive silicone rubber blanket. As a result, the hydrosilyl group of the hydrosilyl-containing polysiloxane preferentially reacts with the double-bond of the vinyl-containing silyl group by the hydrosilylation reaction rather than the cross-linking polymerization of the vinyl-containing silyl group on the surface of the substrate, and then it is polymerised. And then, a silicone rubber-adhered article that the adhesive silicone rubber blanket made from polysiloxane is applied to the surface thereof is obtained.

Examples of platinum-containing catalyst are platinum complex such as hexane solution of platinum-tetramethyldivinyldisiloxane complex, vinylmethylcyclosiloxane solution including 1.85% to 2.1% of platinum carbonylcyclovinylmethylsiloxane complex such as SIP6829.2 that is available from Gelest Inc., both-terminal-vinyl polydimethylsiloxane solution including 3% to 3.5% of platinum-divinyltetramethyldisiloxane complex such as SIP6830.3 that is available from Gelest Inc., xylene solution including 2.1% to 2.4% of platinum-divinyltetramethyldisiloxane complex such as SIP6831.2 that is available from Gelest Inc., pale colored xylene solution including 2.1% to 2.4% of platinum-divinyltetramethyldisiloxane complex such as SIP6831.2LC that is available from Gelest Inc., cyclomethylvinylsiloxane solution of 2% to 2.5% of platinum-cyclic vinylmethylsiloxane complex such as SIP6832.2 that is available from Gelest Inc., octanol solution including 2% to 2.5% of platinum-octanal/octanol complex such as SIP6833.2 that is available from Gelest Inc. Instead of platinum-containing catalyst, a rhodium-containing catalyst for example toluene solution of 3% to 3.5% including tris(dibutylsulfide)rhodiumtrichloride such as INRHO78 that is available from Gelest Inc. can be used.

Examples of procedures in which the adhesive silicone rubber blanket is adhered to singular base material for adhesion were explained. However, pulural base materials for adhesion for example two base materials for adhesion can be also used in the procedure. For example, each of the surface thereof on which silyl-ether-linkage is generated by the active silyl group is faced to each other. After applying a silicone rubber composition in between or sandwiching an adhesive silicone rubber blanket that is granular, textile, membranous, filmy or plate-like by the base materials, and if necessary heating thereof, the base materials for adhesion are adhered. Each of plural base materials for adhesion can be homogeneous or heterogeneous. Each substrate of plural base materials can be prepared with the same or different subject matter.

Hereunder, examples of manufacturing a base material for adhesion and a silicone rubber-adhered article are explained in detail.

Example 1

Reaction of Dimethylsiloxane Having Hydrogen at the Terminal: $HSi(CH_3)_2OSi(CH_3)_2H$, Whose Boiling Point is at 70 Degrees Centigrade, and Unsaturated Silane: $CH_2=CHCH_2Si(OC_2H_5)_3$, Whose Boiling Point is at 176 Degrees Centigrade 0.5 mol (67 g) of $HSi(CH_3)_2OSi(CH_3)_2H$, 0.1 mol (20.4 g) of $CH_2=CHCH_2Si(OC_2H_5)_3$ and 0.2 ml of a solution including platinum-containing catalyst that catalyses at room temperature of catalog number SIP6830.3 that is available from Gelest Inc. were added in 200 ml conical flask, and the mixture was stirred for 24 hours at 50 degrees centigrade under nitrogen gas stream. After the reaction, the reaction the mixture was distilled to remove unreacted $HSi(CH_3)_2OSi(CH_3)_2H$. Then, 33.8 g of crude $HSi(CH_3)_2OSi(CH_3)_2CH_2CH_2CH_2Si(OC_2Hs)_3$ was obtained. After the dilution thereof at 82 to 83 degrees centigrade under 10 mmHg of reduced pressure, the desired pure product was obtained.

Elemental Analysis Found (Calculated): C, 46.0% (46.10%), H, 8.9% (8.93%).

Example 2

Method (A) for Manufacturing an Adhesive Base Material Having a Hydrosilyl-Containing Silyl Group on the Surface Thereof After treating the surface of substrates such as a polyethylene terephthalate (PET) resin plate of 30 mm by 50 mm, an aluminum plate of 30 mm by 50 mm and a glass plate of 30 mm by 50 mm by corona discharge treatment by Corona Master, the substrates were immersed for two minutes in 0.5 weight % of $HSi(CH_3)_2OSi(CH_3)_2CH_2CH_2CH_2Si(OC_2H_5)_3$ in methanol-water mixed solution whose ratio is 95/5 by weight. After drying the substrates at room temperature and heating thereof for 10 minutes at 150 degrees centigrade, an adhesive base material having a hydrosilyl-containing silyl group on the surface thereof was obtained.

By X-ray-induced photoelectron spectroscopy (XPS) using an equipment of catalog number ESCA-5600 that is available from Physical Electronics Inc., the obtained adhesive base material having a hydrosilyl-containing silyl group on the surface thereof was determined at 350 W of Al output power and 45-degree angle of acceptance angle. It was determined that each of the PET resin plate, the aluminum plate and the glass plate has the hydrosilyl-containing silyl group on the surface thereof because C1s peak at 184 eV, Sils peak for HS and Si1s peak for $SiCH_3$ were observed by the determination.

Example 3

Method (B) for Manufacturing an Adhesive Base Material Having a Hydrosilyl-Containing Silyl Group on the Surface Thereof After treating the surface of a substrate such as a PET resin plate of 30 mm by 50 mm, an aluminum plate of 30 mm by 50 mm and a glass plate of 30 mm by 50 mm by corona discharge treatment by Corona Master, the substrate was immersed for 2 minutes in 0.2 weight % of $CH_2=CHCH_2CH_2CH_2CH_2CH_2Si(OCH_3)_3$ in methanol solution. After dying the substrate at room temperature and heating thereof for 10 minutes at 150 degrees centigrade, an adhesive base material having $CH_2=CH$ on the surface thereof was obtained. The obtained adhesive base material having $CH_2=CH$ on the surface thereof was immersed in 100 ml of isopropanol solution of 10 g of $HSi(CH_3)_2OSi(CH_3)_2H$ and 0.2 ml of solution including platinum-containing catalyst of catalog number SIP6830.3 that is available from Gelest Inc. for 10 minutes at 70 degrees centigrade, and an adhesive base material having hydrosilyl-containing silyl group on the surface thereof was obtained. By XPS using an equipment of catalog number ESCA-5600 that is available from Physical Electronics Inc., the obtained adhesive base material having a hydrosilyl-containing silyl group on the surface thereof were determined at 350 W of Al output power and 45-degree angle of acceptance angle. It was determined that each of the PET resin plate, the aluminum plate and the glass plate has the hydrosilyl-containing silyl group on the surface thereof because C1s peak at 184 eV, Si1s peak for HSi and Si1s peak for $SiCH_3$ were observed by the determination.

Example 4

Method (C) for Manufacturing an Adhesive Base Material Having $CH_2=CH$ on the Surface Thereof After treating the surface of substrates such as a PET resin plate of 30 mm by 50 mm, an aluminum plate of 30 mm by 50 mm and a glass plate of 30 mm by 50 mm by corona discharge treatment by Corona Master, the substrates were immersed for two minutes in 0.1 weight % of $CH_2=CHSi(OCH_3)_2O$ $[SiOCH_3(CH=CH_2)O]_2Si(OCH_3)_2CH=CH_2$ in methanol-water mixed solution whose ratio is 95/5 by weight. After drying the substrates at room temperature and heating thereof for 5 minutes at 170 degrees centigrade, an adhesive base material having $CH_2=CH$ on the surface thereof was obtained. By XPS using an equipment of catalog number ESCA-5600 that is available from Physical Electronics Inc., the obtained adhesive base material having $CH_2=CH$ on the surface thereof was determined at 350 W of Al output power and 45-degree angle of acceptance angle. It was determined that each of the PET resin plate, the aluminum plate and the glass plate has $CH_2=CH$ on the surface thereof because C1s peak for $CH_2=CH$ at 184 eV was observed by the determination.

Example 5

Method (D) for Manufacturing an Adhesive Base Material Having Alkoxysilyl Group on the Surface Thereof After treating the surface of substrates such as a polyethylene terephthalate (PET) resin plate of 30 mm by 50 mm, an aluminum plate of 30 mm by 50 mm and a glass plate of 30 mm by 50 mm by corona discharge treatment by Corona Master, the substrates were immersed for 2 minutes in 0.1 weight % of $(C_2H_5O)_3SiCH_2CH_2Si(OC_2H_5)_3$ in ethanol-water mixed solution whose ratio is 95/5 by weight. After drying the substrates at room temperature and heating thereof for 60 minutes at 120 degrees centigrade, an adhesive base material having $C_2H_5OSi$ on the surface thereof was obtained.

By XPS using an equipment of catalog number ESCA-5600 that is available from Physical Electronics Inc., the obtained adhesive base material having $C_2H_5OSi$ on the surface thereof was determined at 350 W of Al output power and 45-degree angle of acceptance angle. It was determined that each of the PET resin plate, the aluminum plate and the glass plate has $C_2H_5OSi$ on the surface thereof because C1s peak for $C_2H_5OSi$ at 184 eV, O1s peak for $C_2H_5OSi$ at 184 eV and Si1s peak for $C_2H_5OSi$ at 184 eV were observed.

Example 6

Method for Manufacturing Adhesive Article from Surface of Base Material and Silicone Rubber Mixture of 100 parts by weight of terminal-vinyl type silicone of catalog number DMS-V31, whose molecular weight is 28000, that is available from Chisso Corporation, and 30 parts by weight of hexamethylsilazane-treated silica, and mixture of 3 parts by weight of methyl-H-siloxane copolymer and 2 ml of 200 ppm of platinum catalyst suspension of catalog number SIP6830 that is available from Chisso Corporation are mixed in a mixer in order to obtain a silicone rubber composition. Each of the base materials prepared by conventional methods as the comparative example and the methods (A), (B) and (C) of the present invention was put in a mold with the surface-side up, and the obtained silicone rubber composition was poured into the mold up to the thickness of 2 cm thereof and kept at 40 degrees centigrade to obtain an adhesive article. After making a cut in the interface between the base material and the silicone rubber, peeling strength of the adhesive article was determined at tensile speed of 5 mm per minute. Each peeling strength of the adhesive articles prepared by the base material of the present invention to which the unsaturated group or the hydrosilyl-containing silyl group was introduced was 4 kN/m or more. After peeling the silicone rubber, the surface of the fractured silicone rubber was in a state of delamination. The result shows that the surface of the base material to which the unsaturated group or the hydroxysilyl-containing silyl group was introduced easily and firmly adheres to silanol silicone rubber. On the other hand, comparative examples without using the base material of the present invention could not obtain adhesive articles as the base material and the silicone rubber thereof were unstuck, and therefore each peeling strength thereof was 0 kN/m.

Example 7

Method for Manufacturing Adhesive Article from Surface of Base Material and Silicone Rubber Mixture of 100 parts by weight of silanol silicone group of catalog number DMS-S33, whose molecular weight is 43500, that is available from Chisso Corporation, 50 parts by weight of hexamethylsilazane-treated silica, 4 g of $CH_3Si(OCOCH_3)_3$ and 0.1 g of dibutyl tin malate were mixed in order to obtain a silicone rubber composition. Each of the comparative base materials and the base material of the present invention whose surface was introduced by the alkoxysilyl group was put in a mold with the surface-side up, and the obtained silicone rubber composition was poured into the mold and then heated thereof at 140 degrees centigrade for 20 minutes to obtain an adhesive article. After making a cut in the interface between the base material and the silicone rubber, peeling strength thereof was determined at tensile speed of 5 mm per minute. Peeling strength of the adhesive article whose surface was introduced by the alkoxysilyl group was 5 kN/m or more. After peeling the silicone rubber, the surface of the fractured silicone rubber was in a state of delamination. The result shows that the surface of the base material to which the alkoxysilyl group was introduced easily and firmly adheres to silanol silicone rubber. On the other hand, comparative examples without using the base material of the present invention could not obtain adhesive articles as the base material and the silicone rubber thereof were unstuck, and therefore each peeling strength thereof was 0 kN/m.

Example 8

Method for Manufacturing Adhesive Article from Surface of Base Material and Silicone Rubber Mixture of 100 parts by weight of terminal-vinyl type silicone of catalog number VDF-131 that is available from Chisso Corporation and 40 parts by weight of hexamethylsilazane-treated silica, and 4 parts by weight of dicumyl peroxide were mixed in order to obtain a silicone rubber composition. Each of the comparative base materials and the base material of the present invention whose surface was introduced by $CH_2$=CH group was put in a mold with the surface-side up, and the obtained silicone rubber composition was poured into the mold and then heated thereof at 150 degrees centigrade for 20 minutes to obtain an adhesive article. After making a cut in the interface between the base material and the silicone rubber, peeling strength thereof was determined at tensile speed of 5 mm per minute. Peeling strength of the adhesive article whose surface was introduced by $CH_2$=CH group of the unsaturated group was 6 kN/m or more. After peeling the silicone rubber, the surface of the fractured silicone rubber was in a state of delamination. The result shows that the surface of the base material to which $CH_2$=CH group was introduced easily and firmly adheres to the silicone rubber by peroxide cross-linkage. On the other hand, comparative examples without using the base material of the present invention could not obtain adhesive articles as the base material and the silicone rubber thereof were unstuck, and therefore each peeling strength thereof was 0 kN/m.

Example 9

Method for Manufacturing Another Base Material for Adhesion and Silicone Rubber-Adhered Article (Preparation of Base Material for Adhesion)

As a substrate, aluminum plate was washed in acetone by 30 minutes of ultrasonic irradiation and then in ion-exchange water by 10 minutes of ultrasonic irradiation twice. The surface of the substrate was treated by corona discharge treatment under atmospheric pressure to oxidize the surface thereof and generate hydroxyl group thereon. Six substrates of such were obtained, and each substrate was immersed into each ethanol aqueous solution, whose volume ratio of ethanol and water is 95:5, of 0.1 g/L of vinylmethoxysiloxane (VMS) represented by $(CH_2$=CH—$)(CH_3O$—$)_2Si$—O—$[(CH_2$=CH—$)(CH_3O$—$)Si$—O$]_{b1}$—$Si($—$OCH_3)_2($—$CH$=$CH_2)$ in which b1 is 3.78 and the average molecular weight is 635.6, 0.5 g/L thereof, 1.0 g/L thereof, 2.0 g/L thereof, 3.0 g/L thereof, 5.0 g/L thereof and 10 g/L thereof for five minutes. After collecting each substrate from each aqueous solution, it was heated at 150 degrees centigrade for 10 minutes. Then, unreacted vinylmethoxysiloxane (VMS) was washed by ethanol and dried to obtain a base material for adhesion (VMS-Al). Surface analysis of the washed Al substrate and the obtained base material was performed by X-ray photoelectron spectroscopy (XPS analysis). The result thereof is shown in FIG. 1. Also, the ratio of surface element regarding the washed Al substrate and the obtained base material was also shown in Table 1.

TABLE 1

| | Element | | | |
|---|---|---|---|---|
| | C | O | Si | Al |
| Washed Al substrate | 19.10% | 60.50% | — | 19.75% |
| Base Material for Adhesion (VMS-Al) | 22.07% | 49.27% | 10.76% | 17.90% |

As shown in FIG. 1 and Table 1, vinylmethoxysiloxane (VMS) was introduced to the surface of Al substrate.

(Preparation of Silicone Rubber-Adhered Article)

After poly(methylvinylsiloxane) of catalog number KE-1935-A and poly(methylsiloxane) of catalog number KE-1935-B that are both available from Shin-Etsu Chemical Co., Ltd., and platinum-containing catalyst were mixed at required time, any remaining air therein was evacuated under reduced pressure therein in order to prepare liquid composition for forming silicone rubber. The obtained liquid composition was applied onto the base material for adhesion (VMS-Al) and was hardened by heating thereof at 50 degrees centigrade to prepare an adhesive silicone rubber blanket. The blanket was reacted with the vinyl group derived from the vinylmethoxysiloxane (VMS) on the surface of the base material by crosslinkage, and as a result a silicone rubber-adhered article was obtained. For each of six ethanol solution with different concentration of the vinylmethoxysiloxane (VMS), a silicone rubber-adhered article was obtained. As a comparative example, a comparative silicone rubber-adhered article was obtained by the same procedures except for not using the ethanol solution of the vinylmethoxysiloxane (VMS). Peeling strength of each of the silicone rubber-adhered article and the comparative silicone rubber-adhered article was determined by 90 degrees peeling assay in which the adhesive silicone rubber blanket was peeled off from the base material for adhesion according to JIS K6256-2:2005. A correlation chart of the concentration of ethanol solution of the vinylmethoxysiloxane (VMS) and peeling strength of each silicone rubber-adhered article is shown in FIG. 2.

As shown in FIG. 2, when the concentration of the ethanol solution of vinylmethoxysiloxane (VMS) was 0.1 to 1.0 g/L, peeling strength of the silicone rubber-adhered article was stronger if the solution was more concentrated. However, when the concentration thereof is more than 1.0 g/L, the peeling strength of the silicone rubber-adhered article plateaus at about 1.0 kN/m. In each case, peeling strength thereof was stronger compared to the case of comparative silicone rubber-adhered article whose peeling strength was 0.4 kN/m that was prepared without the ethanol solution of vinylmethoxysiloxane (VMS).

Example 10

Method for Manufacturing Another Base Material for Adhesion and a Silicone Rubber-Adhered Article (Preparation of Base Material for Adhesion)

As same as the procedures of Example 9 (preparation of base material for adhesion), by using the ethanol solution of 11.0 g/L of vinylmethoxysiloxane (VMS), seven substrates (VMS-Al) were obtained. Each of the obtained substrates was immersed into hexane solution of 100 ppm of platinum-tetramethyldivinyldisiloxane complex respectively for 1 minute, 2 minutes, 3 minutes, 4 minutes, 5 minutes, 7 minutes and 10 minutes. After each substrate was collected and dried, a base material for adhesion (Pt-VMS-Al) of which a platinum-containing catalyst was applied onto the surface was obtained respectively.
(Preparation of Silicone Rubber-Adhered Article)

As same as the procedures of Example 9 (Preparation of silicone rubber-adhered article), poly(methylvinylsiloxane), poly(methylsiloxane) and platinum-containing catalyst were mixed at required time, and then any remaining air therein was evacuated under reduced pressure in order to prepare liquid composition for forming silicone rubber. The obtained liquid composition was applied onto the base material for adhesion (Pt-VMS-Al) and was hardened by heating thereof at 50 degrees centigrade to prepare an adhesive silicone rubber blanket. The blanket was reacted and bound with the vinyl group derived from the vinylmethoxysiloxane (VMS) on the surface of the base material through crosslinkage, and as a result each of silicone rubber-adhered articles was obtained. For each of seven different immersing time of the substrate into hexane solution of platinum-tetramethyldivinyldisiloxane complex, seven silicone rubber-adhered articles were obtained. As a comparative example, a comparative silicone rubber-adhered article was obtained by the same procedures except for no using the hexane solution of platinum-tetramethyldivinyldisiloxane complex. As same as Example 9, peeling strength of each of the silicone rubber-adhered article and the comparative silicone rubber-adhered article was determined by 90 degrees peeling assay in which the adhesive silicone rubber blanket was peeled off from the base material for adhesion. A correlation chart of the immersing time of the substrate into the hexane solution of platinum-tetramethyldivinyldisiloxane complex and peeling strength of each silicone rubber-adhered article in FIG. 3.

As shown in FIG. 3, when the immersing time of the base material into hexane solution of platinum-tetramethyldivinyldisiloxane complex was 1 to 2 minutes, peeling strength of the silicone rubber-adhered article was stronger if the immersing time was longer. However, when the immersing time was longer than 2 minutes, the peeling strength of the silicone rubber-adhered article plateaus at 4.0 kN/m. In each case, peeling strength thereof was stronger compared to the comparative silicone rubber-article with the peeling strength of 1.0 kN/m that was prepared without using the hexane solution of platinum-tetramethyldivinyldisiloxane complex and its immersion time was 0 minute.

Example 11

Method for Manufacturing Another Base Material for Adhesion and Silicone Rubber-Adhered Article (Preparation of Base Material for Adhesion)

As same as a procedures of Example 9 (Preparation of base material for adhesion), by using the ethanol solution of 1.0 g/L of vinylmethoxysiloxane (VMS), four substrates (VMS-Al) were obtained. For 3 minutes, each of the obtained substrates was respectively immersed into a hexane solution of 20 ppm of platinum-tetramethyldivinyldisiloxane complex, the hexane solution of 60 ppm thereof, the hexane solution of 100 ppm thereof, and the hexane solution of 200 ppm thereof. After each substrate was collected and dried, a base material for adhesion (Pt-VMS-Al) of which a platinum-containing catalyst is applied onto the surface was obtained respectively.
(Preparation of Silicone Rubber-Adhered Article)

As same as the procedures of Example 9 (Preparation of silicone rubber-adhered article), poly(methylvinylsiloxane), poly(methylsiloxane) and platinum-containing catalyst were mixed at required time, and then any remaining air therein was evacuated under reduced pressure in order to prepare liquid composition for forming silicone rubber. The obtained liquid composition was applied onto the base material for adhesion (Pt-VMS-Al) and was hardened by heating thereof at 50 degrees centigrade to prepare an adhesive silicone rubber blanket. The blanket was reacted with the vinyl group derived from the vinylmethoxysiloxane (VMS) on the surface of the base material for adhesion by crosslinkage, and as a result each of silicone rubber-adhered articles was obtained. For each of four hexane solution with different concentration of the platinum-tetramethyldivinyldisiloxane complex, silicone rubber-adhered articles were obtained. As a comparative example, a comparative silicone rubber-adhered article was obtained by the same procedures except for not using the hexane solution of the platinum-tetramethyldivinyldisiloxane complex. As same as Example 9, peeling strength of each of the silicone rubber-adhered article and the comparative silicone rubber-adhered article was determined by 90 degrees peeling assay in which the adhesive silicone rubber blanket was peeled off from the base material for adhesion. A correlation chart of the concentration of the hexane solution of platinum-tetramethyldivinyldisiloxane complex and peeling strength of each silicone rubber-adhered article in FIG. 4.

Figure 4:
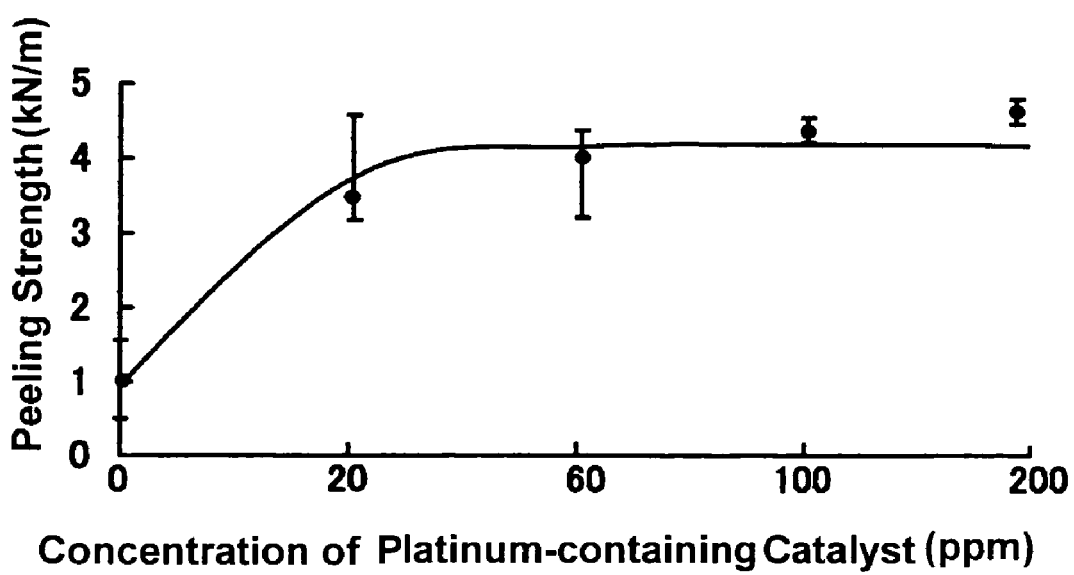
FIG. 4 is a graph of the correlation chart of the concentration of a platinum-containing catalyst suspension, in which the base material for adhesion is immersed at the time of manufacturing a silicone rubber-adhered article, and peeling strength of the obtained silicone rubber-adhered article.

As shown in FIG. 4, when the concentration of the hexane solution of platinum-tetramethyldivinyldisiloxane complex was more than 200 ppm, the peeling strength of the silicone rubber-adhered article stayed constant at 4.0 kN/m. Each peeling strength of the silicone rubber-adhered article of the present invention was stronger compared to the comparative silicone rubber-adhered article prepared without the hexane solution of platinum-tetramethyldivinyldisiloxane complex whose peeling strength was 1.0 kN/m.

Example 12

Method for Manufacturing Another Base Material for Adhesion and Silicone Rubber-Adhered Article As same as the procedures of Example 9 (preparation of base material for adhesion) except for using a glass plate instead of aluminum plate, a substrate (VMS-Glass) instead of VMS-Al was obtained. The obtained substrate was immersed into hexane solution of 100 ppm of platinum-tetramethyldivinyldisiloxane complex for 3 minutes. After collecting each substrate therefrom and drying thereof, a base material for adhesion (Pt-VMS-Glass) of which the platinum-containing catalyst is applied on the surface was obtained. Then, as same as the procedures of Example 9 (Preparation of silicone rubber-adhered article), poly(methylvinylsiloxane), poly(methylsiloxane) and platinum-containing catalyst were mixed at required time, and then any remaining air therein was evacuated under reduced pressure the pressure in order to prepare liquid composition for forming silicone rubber. The obtained liquid composition was applied onto the base material for adhesion (Pt-VMS-Glass) and was hardened by heating thereof at 150 degrees centigrade to prepare an adhesive silicone rubber blanket. The blanket was reacted and bound with the vinyl group derived from the vinylmethoxysiloxane (VMS) on the surface of the base material through crosslinkage, and as a result the silicone rubber-adhered article was obtained. As same as Example 9, peeling strength of the silicone rubber-adhered article was determined by 90 degree peeling assay in which the adhesive silicone rubber blanket was peeled off from the base material for adhesion, and peeling strength thereof was 3.7 kN/m.

Examples 13 to 15

Method for Manufacturing Another Base Material for Adhesion and Silicone Rubber-Adhered Article As same as the procedures of Example 12 except for using a epoxy resin plate, polypropylene (PP) plate, and polyethylene (PE) plate, a substrate (Pt-VMS-EpoxyResin), a substrate (Pt-VMS-PP) and a substrate (Pt-VMS-PE) were obtained, and each silicone rubber-adhered article prepared using each of the substrates were obtained. Peeling strength of each silicone rubber-adhered article was determined by the same peeling assay as Example 12. Peeling strength of the silicone rubber-adhered article prepared using the substrate (Pt-VMS-EpoxyResin) was 3.8 kN/m. Peeling strength of the article prepared using the substrate (Pt-VMS-PP) was 3.2 kN/m, and that of the article using the substrate (Pt-VMS-PE) was 3.3 kN/m.

As shown in the Examples, adhesive strength of the silicone rubber-adhered article prepare by using a base material for adhesion of the present invention was strong. Especially, adhesive strength of the silicone rubber-adhered article prepared by adhering the solid body such as the adhesive silicone rubber blanket having reactivity to the hydroxy group, and the base material for adhesion whose substrate surface comprises the vinyl-containing silyl group and is applied the platinum-containing catalyst and so on was sufficiently strong as the adhesive silicone rubber blanket was torn if the article was forced to be peeled.

INDUSTRIAL APPLICABILITY

A base material for adhesion of the present invention is prepared by adhering the adhesive silicone rubber article and the surface of the substrate made from metal, polymer resin, glass or ceramics in order to protect the substrate and to form elasticity thereon.

The silicone rubber-adhered article prepare by adhering the adhesive silicone rubber blanket and the substrate is used for home electric appliances, stationery and so on that require elasticity on the surface thereof. Additionally, because the silicone rubber-adhered article prepared by sandwiching the adhesive silicone rubber blanket by the plural substrates and strongly adhering thereof through chemical bonding, the article is used for a product that requires strong adhesive strength.

What is claimed is:

1. A method for manufacturing a silicone rubber-adhered article, the method comprising
    applying a composition including a silicone rubber component of vinyl silicone and/or silanol silicone to a surface of a substrate of a base material, and
    hardening the composition at room temperature or by heating to form an adhesive silicone rubber blanket and to adhere the surface of the substrate with the adhesive silicone rubber blanket,
    wherein the substrate of the base material comprises a metal, a polymer resin, a glass material or a ceramic material, and the surface of the substrate contains a silyl-ether-linkage comprised of at least one active silyl group bound to at least one dehydrogenated residue of a hydroxyl group,
    wherein the at least one active silyl group is selected from the group consisting of a hydrosilyl-containing silyl group, a vinyl-containing silyl group, an alkoxysilyl-containing silyl group and a hydrolytic group-containing silyl group comprising a reactive group,
    wherein the vinyl silicone is represented by $CH_2=CH(CH_3)_2SiO[SiCH=CH_2(CH_3)O]_e[Si(R^{13})R^{14}O]_fSi(CH_3)_2CH=CH_2$ in which $R^{13}$ and $R^{14}$ are an alkyl group, an alkenyl group, an alkyloxy group or a fluoro-substituted alkyl group that respectively have 1 to 12 carbon atoms; an aralkyl group; or an aryl group, e is a number of 1 to 80, and f is a number of 0 to 80, and
    wherein the silanol silicone is represented by $A-(CH_3)_2SiO[Si(CH_3)_2O]_g[Si(R^{15})R^{16}O]_hSi(CH_3)_2-A$ in which $R^{15}$ and $R^{16}$ are an alkyl group, an alkenyl group, an alkyloxy group or a fluoro-substituted alkyl group that respectively have 1 to 12 carbon atoms; and aralkyl group; or an aryl group, A is hydroxyl group, an alkyloxy group, an alkenyloxy group, an aryloxy group, an acyloxy group that respectively have 1 to 4 carbon atoms, an iminooxy group, or an amino group, g is a number of 1 to 80, and h is a number of 0 to 80.

2. The method for manufacturing the silicone rubber-adhered article according to claim 1, wherein the composition further includes a cross-linking agent and/or a cross-linking catalyst.

3. The method for manufacturing the silicone rubber-adhered article according to claim 1, wherein the method further comprises, prior to the applying of the composition, applying a material comprised of a compound including the at least one active silyl group to the surface of the substrate having the hydroxyl group, and drying and heating the surface of the substrate to form the silyl-ether-linkage.

4. The method for manufacturing the silicone rubber-adhered article according to claim 3, wherein the compound is an alkoxysilyl compound.

5. The method for manufacturing the silicone rubber-adhered article according to claim 3, wherein the material further comprises a solvent.

6. The method for manufacturing the silicone rubber-adhered article according to claim 1, wherein the hydroxyl group is an inherent hydroxyl group on the surface of the substrate.

7. The method for manufacturing the silicone rubber-adhered article according to claim 1, wherein the method further comprises, prior to the applying of the composition, treating the surface of the substrate to generate the hydroxyl group on the surface of the substrate.

8. The method for manufacturing the silicone rubber-adhered article according to claim 7, wherein the generated hydroxyl group is produced by corona discharge treatment, atmospheric-pressure plasma treatment or ultraviolet irradiation treatment.

* * * * *